United States Patent
Downs et al.

(10) Patent No.: US 11,946,531 B2
(45) Date of Patent: Apr. 2, 2024

(54) ELECTRIC DRIVE MODULE WITH TRANSMISSION HAVING PARALLEL TWIN GEAR PAIRS SHARING LOAD TO A FINAL DRIVE GEAR

(71) Applicant: AMERICAN AXLE & MANUFACTURING, INC., Detroit, MI (US)

(72) Inventors: James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 65 days.

(21) Appl. No.: 17/691,275

(22) Filed: Mar. 10, 2022

(65) Prior Publication Data
US 2022/0196126 A1 Jun. 23, 2022

Related U.S. Application Data

(63) Continuation of application No. 17/527,235, filed on Nov. 16, 2021, now Pat. No. 11,293,534, which is a
(Continued)

(51) Int. Cl.
*B60K 1/00* (2006.01)
*F16H 37/08* (2006.01)
(Continued)

(52) U.S. Cl.
CPC .......... *F16H 37/0813* (2013.01); *B60K 1/00* (2013.01); *F16H 48/08* (2013.01);
(Continued)

(58) Field of Classification Search
CPC . B60K 1/00; B60K 2001/001; F16H 37/0813; F16H 1/22; F16H 48/08; F16H 2057/02034
See application file for complete search history.

(56) References Cited

U.S. PATENT DOCUMENTS 2,069,411 A 12/1933 Keese
4,283,968 A * 8/1981 Kalns .................... F16H 57/037
475/140
(Continued)

FOREIGN PATENT DOCUMENTS

CN 108204446 A * 6/2018 ............... B60K 1/00
CN 108204454 A 6/2018
(Continued)

OTHER PUBLICATIONS

First Examination Report issued by the IPI in related Indian Application No. 202244012833.
(Continued)

*Primary Examiner* — Sherry L Estremsky
(74) *Attorney, Agent, or Firm* — Reising Ethington P.C.

(57) ABSTRACT

An electric drive module that includes an electric motor, a differential assembly, and a transmission that transmits rotary power between the electric motor and the differential assembly. The transmission has first and second reductions. The first reduction has a drive gear, which is rotatable about a first axis, and a pair of first reduction gears that are each meshingly engaged to the drive gear rotatable about a respective second axis. The second axes are spaced apart from one another and are parallel to the first axis. The second reduction has a driven gear and a pair of second reduction gears. The driven gear is rotatable about a third axis that is parallel to the first axis. Each of the second reduction gears is being meshingly engaged to the driven gear and non-rotatably coupled to an associated one of the first reduction gears.

19 Claims, 25 Drawing Sheets

Related U.S. Application Data continuation-in-part of application No. PCT/US2020/062541, filed on Nov. 30, 2020.

(60) Provisional application No. 63/161,218, filed on Mar. 15, 2021, provisional application No. 63/161,164, filed on Mar. 15, 2021, provisional application No. 62/942,496, filed on Dec. 2, 2019.

(51) Int. Cl.
*F16H 48/08* (2006.01)
*F16H 63/34* (2006.01)
*F16H 57/02* (2012.01)

(52) U.S. Cl.
CPC ..... *F16H 63/3425* (2013.01); *F16H 63/3475* (2013.01); *B60K 2001/001* (2013.01); *F16H 2057/02034* (2013.01); *F16H 2057/02052* (2013.01)

(56) References Cited

U.S. PATENT DOCUMENTS

| | | | |
|---|---|---|---|
| 5,620,387 A | 4/1997 | Janiszewski | |
| 5,662,009 A * | 9/1997 | Palmer | F16H 3/40 475/221 |
| 5,896,775 A | 4/1999 | Southcott | |
| 7,244,210 B2 | 7/2007 | Hamai et al. | |
| 7,363,995 B2 | 4/2008 | Downs et al. | |
| 7,377,343 B2 | 5/2008 | Adams, III et al. | |
| 7,445,067 B2 | 11/2008 | Marsh et al. | |
| 7,559,390 B2 | 7/2009 | Marsh et al. | |
| 7,588,508 B2 | 9/2009 | Marsh et al. | |
| 8,479,851 B2 | 7/2013 | Mack et al. | |
| 8,491,432 B2 * | 7/2013 | Radermacher | B60K 6/48 475/5 |
| 8,597,145 B2 | 12/2013 | Stuart | |
| 8,663,051 B2 | 3/2014 | Sten | |
| 8,998,764 B2 | 4/2015 | Sten et al. | |
| 8,998,765 B2 | 4/2015 | Sten | |
| 9,030,063 B2 * | 5/2015 | Rawlinson | H02K 9/20 310/52 |
| 9,303,745 B2 * | 4/2016 | Wenthen | F16H 37/082 |
| 9,500,267 B2 | 11/2016 | Hederstad et al. | |
| 9,512,900 B2 | 12/2016 | Hederstad et al. | |
| 9,593,754 B2 | 3/2017 | Sten | |
| 9,637,022 B2 | 5/2017 | Gavling et al. | |
| 9,638,285 B2 | 5/2017 | Huang | |
| 9,719,585 B2 | 8/2017 | Sten | |
| 9,777,818 B2 | 10/2017 | Valente et al. | |
| 9,783,035 B1 | 10/2017 | Huang et al. | |
| 9,862,289 B1 | 1/2018 | Crecelius | |
| 9,903,460 B2 | 2/2018 | Tronnberg et al. | |
| 9,958,049 B1 | 5/2018 | Sten et al. | |
| 10,006,533 B1 | 6/2018 | Strandberg | |
| 10,316,946 B2 | 6/2019 | Sten et al. | |
| 10,378,629 B2 | 8/2019 | Hiyoshi | |
| 10,378,641 B2 * | 8/2019 | Nakano | F16H 48/40 |
| 10,487,933 B2 | 11/2019 | Valente et al. | |
| 10,525,810 B2 | 1/2020 | Jegebris et al. | |
| 10,675,984 B2 | 6/2020 | Ronning et al. | |
| 10,704,663 B2 | 7/2020 | Downs et al. | |
| 10,732,155 B2 | 8/2020 | Valente et al. | |
| 10,879,749 B2 | 12/2020 | Morgante et al. | |
| 10,923,972 B2 | 2/2021 | Ronning et al. | |
| 10,927,937 B2 | 2/2021 | Downs et al. | |
| 10,975,945 B2 | 4/2021 | Downs et al. | |
| 10,989,297 B2 | 4/2021 | Guarino | |
| 11,034,237 B2 | 6/2021 | Hirao et al. | |
| 11,207,976 B2 | 12/2021 | Ghatti et al. | |
| 2015/0239527 A1 | 8/2015 | Huang | |
| 2015/0354681 A1 | 12/2015 | Kaltenbach et al. | |
| 2015/0354682 A1 | 12/2015 | Yamamoto et al. | |
| 2018/0170177 A1 | 6/2018 | Yamamoto | |
| 2019/0226566 A1 | 7/2019 | Hillman et al. | |
| 2020/0263770 A1 | 8/2020 | Klurfield | |
| 2021/0102609 A1 | 4/2021 | Ghatti et al. | |
| 2022/0099168 A1 | 3/2022 | Lee et al. | |

FOREIGN PATENT DOCUMENTS

| | | | |
|---|---|---|---|
| CN | 108612810 | 10/2018 | |
| CN | 108612810 A * | 10/2018 | ............... F16H 1/22 |
| CN | 108612810 A | 10/2018 | |
| CN | 109690138 A | 4/2019 | |
| DE | 10339425 A1 | 3/2005 | |
| DE | 202020100331 | 3/2020 | |
| DE | 1031075 B | 8/2020 | |
| EP | 3660351 | 6/2020 | |
| GB | 2463902 A | 3/2010 | |
| JP | H09175349 | 7/1997 | |
| JP | 2005125920 A | 5/2005 | |
| JP | 2010210004 | 9/2010 | |
| JP | 2018049765 A | 3/2018 | |
| JP | 2018059562 A | 4/2018 | |
| JP | 2018105344 A | 7/2018 | |
| JP | 2019094933 A | 6/2019 | |
| JP | 2019173833 A | 10/2019 | |
| JP | 2020143779 A | 9/2020 | |
| KR | 1020100124706 | 11/2010 | |
| KR | 20190068013 A | 6/2019 | |
| WO | 2016120472 | 8/2016 | |
| WO | 2017202319 | 11/2017 | |
| WO | 2019077049 | 4/2019 | |

OTHER PUBLICATIONS

Foreign patent office communication dated Apr. 25, 2022 for the Korean counterpart application KR 10-2022-7008471, filed Mar. 14, 2022.

First Office Action & translation thereof issued by CNIPA in related Chinese Application No. 202080064650.6.

First Examination Report issued by the IPI in related Indian Application No. 202247012949.

First Office Action & translation thereof issued by JPO in related Japanese Application No. 2022039016.

European Search Report dated Nov. 9, 2022 in related European Application No. EP 22162084.2, filed Mar. 15, 2022.

*Split Torque Gearboxes: Requirements, Performance and Applications;* Segade-Robleda, Vilan-Vilan, Lopex-Largo & Casarejos-Ruiz (2012).

*Split Torque Transmission Load Sharing,* Krantz, Rashidi & Kishu (1992).

*Mechanical Engineering Design,* Joseph E. Shigley & Larry D. Mitchell (1983)—Basic mechanical engineering textbook, which on p. 505 discusses the "most frequently encountered mounting problem" where one bearing is required at each end of a shaft. Figure 11-13 on p. 505 illustrates a fixed-free (floating) bearing arrangement, while Figure 11-14 on p. 505 illustrates a fixed-fixed bearing arrangement.

*Mounting Handbook: Mounting of Rotary Bearings;* Shaefler Technologies, p. 17 (2015)—Figure 13 illustrates bearings with "fixed" mounting and "floating" mounting.

Office Action dated Nov. 29, 2022 issued by the JPO in related Indian Application No. 2022516345.

Eaton, Fuller Heavy Duty Transmissions Roadranger Service Manual—Fuller Heavy Duty Transmissions TRSM0430, Jul. 2010, pp. 12-14 (of 182 pages total), Eaton and Dana Corporation, United States.

International Search Report and Written Opinion for International Application PCT/US2020/062541, dated Mar. 18, 2021.

Office Action issued by the CIPO in related Chinese Application No. 2022102516955, filed Mar. 12, 2022.

* cited by examiner

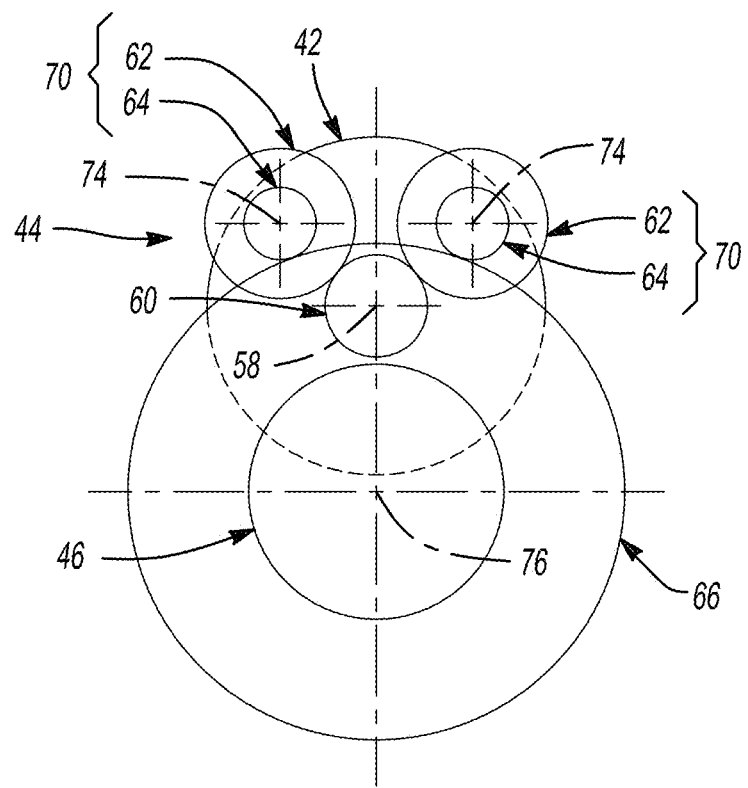
_Fig-4_
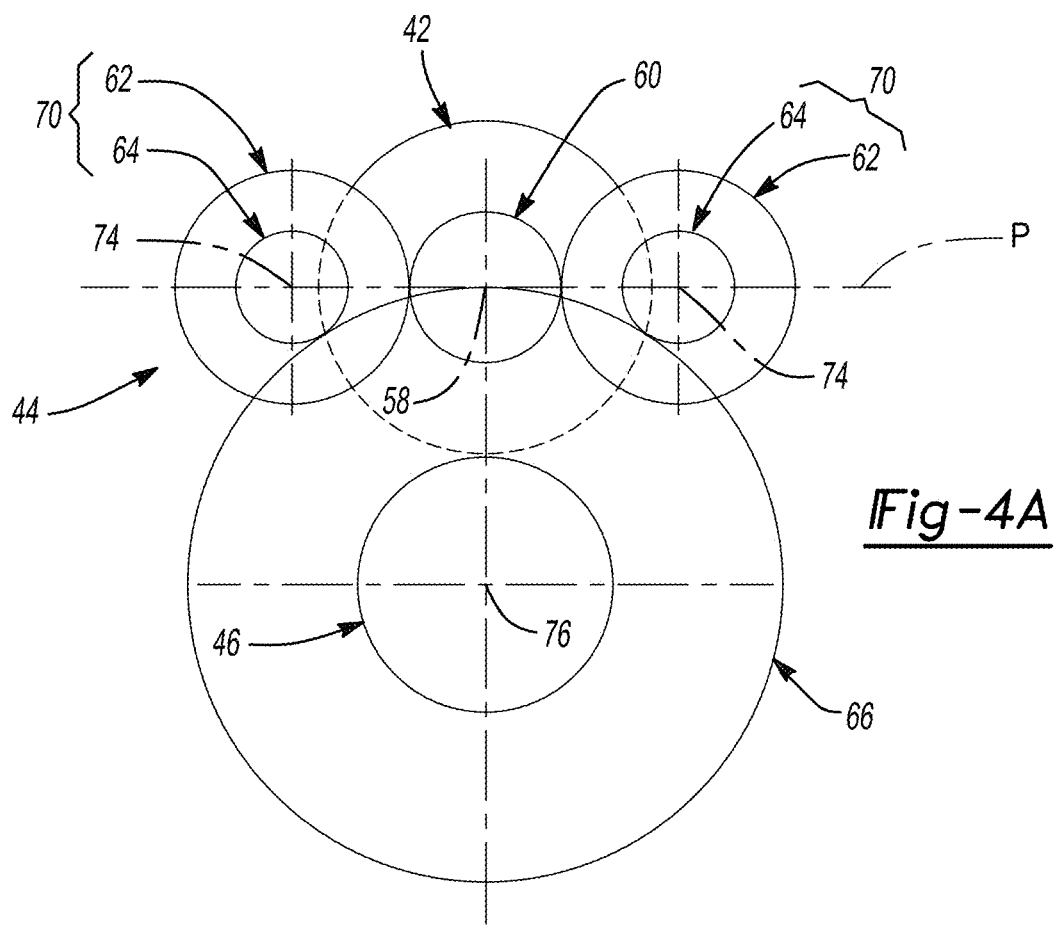
_Fig-4A_

ELECTRIC DRIVE MODULE WITH TRANSMISSION HAVING PARALLEL TWIN GEAR PAIRS SHARING LOAD TO A FINAL DRIVE GEAR

CROSS-REFERENCE TO RELATED APPLICATIONS

This application is a continuation of U.S. patent application Ser. No. 17/527,235 filed Nov. 16, 2021, which a) claims the benefit of U.S. Provisional Patent Application No. 63/161,218 filed Mar. 15, 2021, b) claims the benefit of U.S. Provisional Patent Application No. 63/161,164 filed Mar. 15, 2021, and c) is a bypass continuation-in-part of International Patent Application No. PCT/US2020/062541 filed Nov. 30, 2020, which claims the benefit of U.S. Provisional Patent Application No. 62/942,496 filed Dec. 2, 2019. The disclosures of the above-referenced applications are incorporated by reference as if each application was fully set forth in detail herein.

FIELD

The present disclosure relates to an electric drive module with a transmission having parallel gear pairs that share load to a final drive gear.

BACKGROUND

This section provides background information related to the present disclosure which is not necessarily prior art.

It is known in the art to provide an electric drive module having an electric motor that drives a differential assembly through a transmission. Known electric drive module configurations can have a coaxial arrangement, in which the output shaft of the electric motor, differential assembly and input and output of the transmission are disposed about a common rotational axis, or an arrangement in which the output shaft of the electric motor, the differential assembly and the input and output of the transmission are disposed about two or more rotational axes that are parallel to one another. While such configurations are well suited for their intended purpose, they can be somewhat difficult to package or fit into certain vehicles as there may be insufficient space in a lateral or side-to-side direction or in a radial direction. Accordingly, there remains a need in the art for an electric drive module that is relatively compact in design.

SUMMARY

This section provides a general summary of the disclosure and is not a comprehensive disclosure of its full scope or all of its features.

In one form, the present disclosure provides an electric drive module that includes an electric motor, a differential assembly, and a transmission that transmits rotary power between the electric motor and the differential assembly. The transmission has first and second reductions. The first reduction has a drive gear, which is rotatable about a first axis, and a pair of first reduction gears that are each meshingly engaged to the drive gear rotatable about a respective second axis. The second axes are spaced apart from one another and are parallel to the first axis. The second reduction has a driven gear and a pair of second reduction gears. The driven gear is rotatable about a third axis that is parallel to the first axis. Each of the second reduction gears is being meshingly engaged to the driven gear and non-rotatably coupled to an associated one of the first reduction gears.

In still another form, the present disclosure provides an electric drive module that includes a housing assembly, a motor assembly, a first output shaft and a transmission. The housing assembly includes a motor housing, a gearbox, and a gearbox cover. The motor housing defines a motor cavity. The gearbox and the gearbox cover cooperate to define a transmission cavity. The motor assembly is housed in the motor housing and includes an electric motor and an inverter. The electric motor has a stator and a rotor. The rotor includes a motor output shaft. The first output shaft is rotatable about an output axis. The transmission transmits rotary power between the electric motor and the output shaft and includes a drive gear, a pair of first reduction gears, a pair of second reduction gears and a driven gear. The drive gear is coupled to the motor output shaft for rotation therewith about a first axis. Each of the first reduction gears is meshingly engaged to the drive gear and is rotatable about a respective second axis. The second axes are spaced apart from one another and are parallel to the first axis. Each of the second reduction gears is meshingly engaged to the driven gear and is coupled to an associated one of the first reduction gears for rotation therewith. The driven gear is rotatable about a third axis that is parallel to the first and second axes.

In yet another form, the present disclosure provides an electric drive module that includes a housing, an electric motor, a first output shaft, and a transmission. The electric motor is coupled to the housing and includes a motor output shaft that is rotatable about a motor axis. The first output shaft is rotatable about an output axis that is parallel to the motor axis. The transmission is received in the housing and transmits rotary power between the electric motor and the first output shaft. The transmission has an input pinion, a pair of first compound gears and a driven gear. The input pinion is coupled to the motor output shaft for rotation therewith. Each of the first compound gears is rotatable about a first intermediate axis that is parallel to the motor axis. Each of the first compound gears has a first reduction gear, which is meshingly engaged with the input pinion, and a second reduction gear that is coupled to the first reduction gear for rotation therewith. The driven gear is received in the housing and is meshingly engaged by the second gears. Loading on the driven gear is shared evenly across the second reduction gears.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a schematic illustration of a portion of an electric drive module similar to that of FIG. 1 but illustrating a generic relative positioning of the electric motor, the transmission and the differential assembly;

FIG. 4A is a schematic illustration of a portion of the electric drive module of FIG. 1 illustrating the relative positioning of the electric motor, the transmission and the differential assembly that is shown in FIG. 2;

Corresponding reference numerals indicate corresponding parts throughout the several views of the drawings.

DETAILED DESCRIPTION

Figure 1:
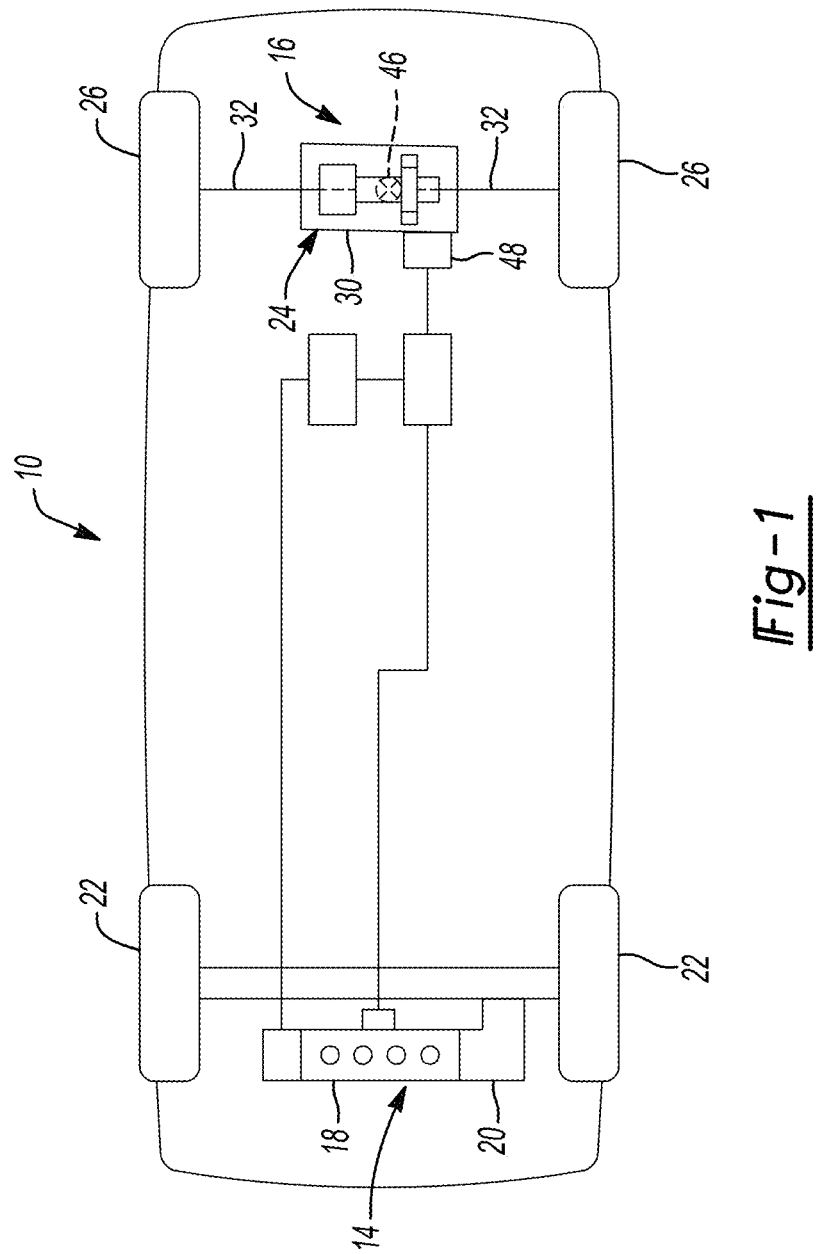
FIG. 1 is a schematic illustration of an exemplary vehicle having an electric drive module constructed in accordance with the teachings of the present disclosure.

With reference to FIG. 1 of the drawings, an exemplary vehicle having a drive module constructed in accordance with the teachings of the present disclosure is generally indicated by reference numeral 10. The vehicle 10 can include a front or primary driveline 14 and a rear or secondary driveline 16. The front driveline 14 can comprise an engine 18 and a transmission 20 and can be configured to drive a front or primary set of drive wheels 22. The rear driveline 16 can comprise an electric drive module 24 that can be configured to drive a rear or secondary set of drive wheels 26 on an as needed or "on demand" basis. While the front wheels 22 are associated with the primary driveline 14 and the rear wheels 26 are associated with the secondary driveline 16 in the present example, it will be appreciated that in the alternative, the rear wheels could be driven by the primary driveline and the front wheels could be driven by the secondary driveline. Moreover, while the electric drive module 24 has been depicted in this example as being configured to drive a secondary set of drive wheels on a part time basis, it will be appreciated that a drive module constructed in accordance with the present teachings could be employed to drive a (front, rear or other) set of drive wheels (e.g., a front or set of wheels) on a full-time basis, either as the sole means of propulsion for the vehicle or in conjunction with another means of propulsion. The electric drive module 24 can comprise a drive unit 30, and a pair of output shafts 32.

Figure 2:
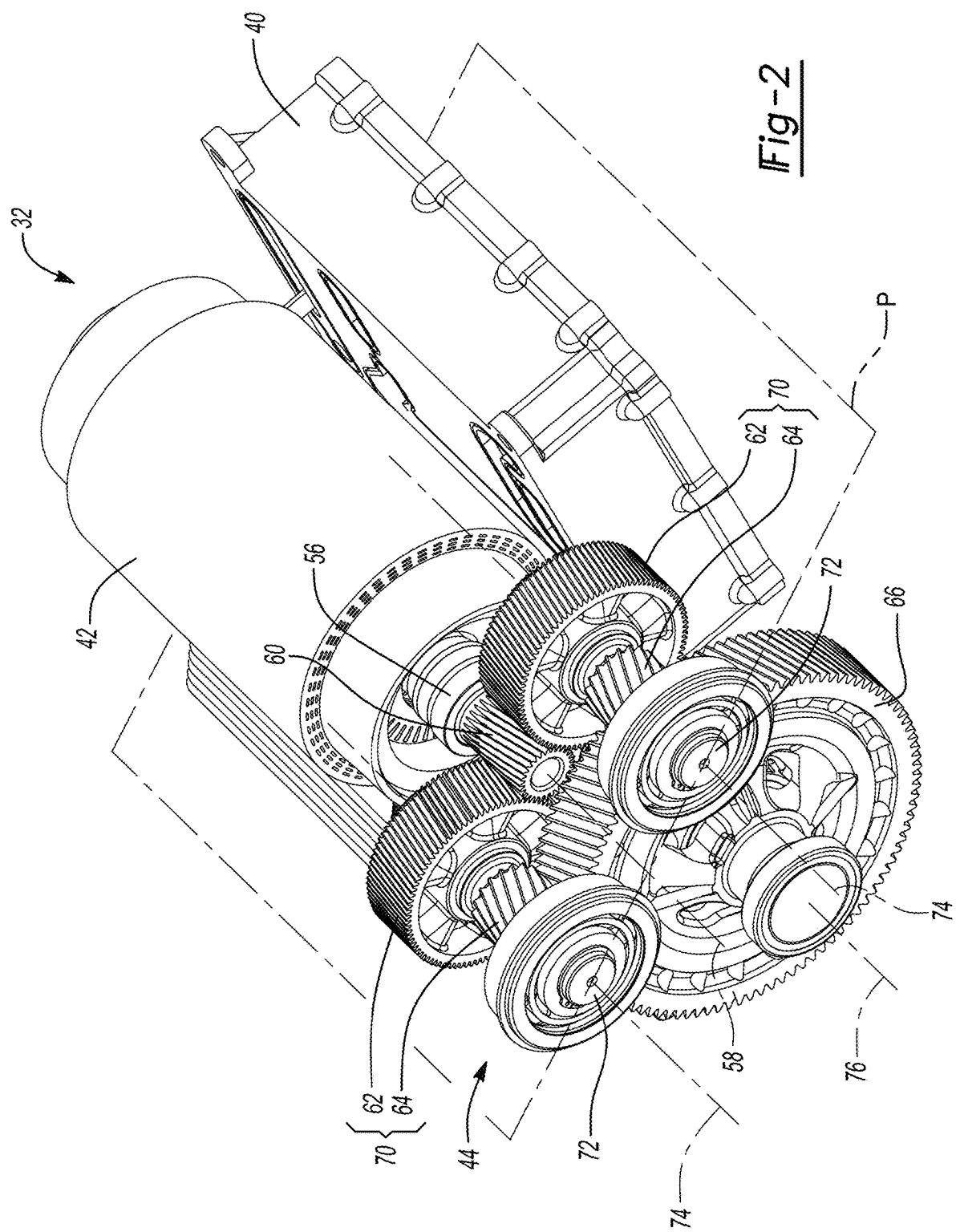
FIG. 2 is a perspective, partly fragmented portion of the electric drive module of FIG. 1 illustrating an electric motor and a transmission in more detail.
Figure 3:
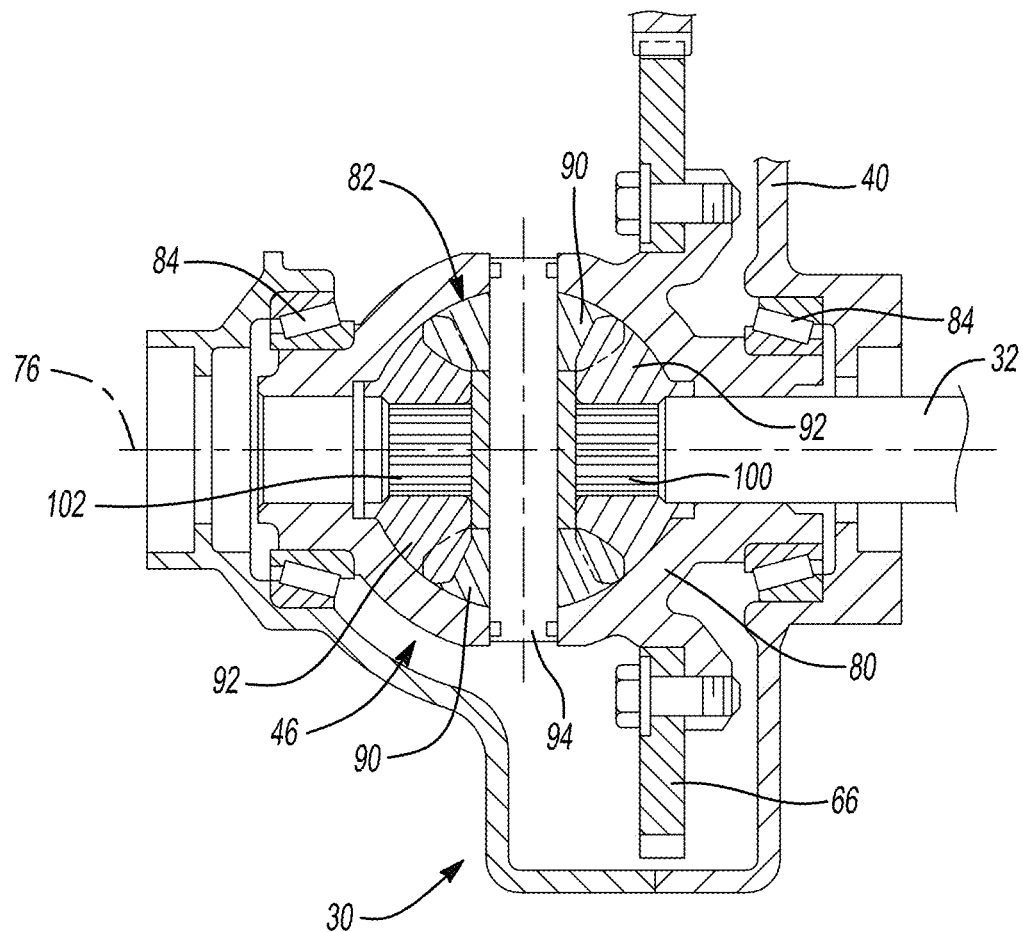
FIG. 3 is a cross-sectional view of a portion of the electric drive module of FIG. 1 illustrating a final drive gear of the transmission and a differential assembly.

With reference to FIGS. 2 and 3, the drive unit 30 can comprise a housing 40, a motor assembly 42, a transmission 44, and a differential assembly 46. The housing 40 can define a structure to which the other components of the drive unit 30 are mounted. The housing 40 can be formed of two or more housing elements that can be fixedly coupled together, such as via a plurality of threaded fasteners. The motor assembly 42 can include any type of electric motor, such as a permanent magnet motor. The motor assembly 42 can be mounted to a flange (not specifically shown) on the housing 40 and can have a motor output shaft 56 that can be disposed along a motor output or first rotational axis 58 (FIG. 4) and received into the housing 40.

With reference to FIGS. 2 and 4, the transmission 44 can comprise one or more transmission stages or reductions that provide a transmission input, which is driven by the output shaft of the motor assembly 42, and a transmission output that drives the differential assembly 46. The transmission 44 can comprise one or more transmission stages or reductions to provide multiple levels of gear reduction, and optionally can include one or more multi-speed transmission stages. Also optionally, a clutch (not shown) can be employed between the transmission output and the differential assembly 46 to selectively de-couple the differential assembly 46 from the motor assembly 42. In the example provided, the transmission 44 comprises a drive gear or input pinion 60, a plurality of first reduction gears 62, a plurality of second reduction gears 64, and a driven gear or final drive gear 66. The input pinion 60 can be coupled to the output shaft of the motor assembly 42 for rotation therewith. The first reduction gears 62 are meshingly engaged with the input pinion 60, have more teeth than the input pinion 60 and have a pitch diameter that is relatively larger than the pitch diameter of the input pinion 60. Each of the first reduction gears 62 can be fixedly coupled to an associated one of the second reduction gears 64 to form a compound reduction (twin) gear 70. The second reduction gears 64 are larger in pitch diameter and have more teeth than the first reduction gears 62. Each of the compound reduction gears 70 can be disposed on a countershaft or axle 72 that is mounted to the housing 40 for rotation about a second rotational axis 74 that is parallel to and offset from first rotational axis 58. Each of the countershafts 72 can be supported by a pair of bearings that can be mounted to the housing 40. It will be appreciated that each of the countershafts 72 can be formed as a discrete component that can be assembled to a corresponding one of the compound reduction gears 70, or could be unitarily and integrally formed with a corresponding one of the compound reduction gears 70. In the example shown in FIG. 2, the rotational axes 74 of the compound gears 70 and the first rotational axis 58 are disposed in a plane P. FIG. 4 depicts a generic example of the transmission 44 in which the second rotational axes 74 are parallel to but offset from the first rotational axis 58 such that all three axes are not disposed in a common plane. FIG. 4A is a view that is similar to that of FIG. 4 but which more accurately depicts the location of the first and second rotational axes 58 and 74.

The final drive gear 66 can be supported by the housing 40 for rotation about an output axis 76. In the example provided: the output axis 76 is parallel to and offset from the second rotational axes 74 and the first rotational axis 58; the input pinion 60, the first reduction gears 62, the second reduction gears 64 and the final drive gear 66 are helical gears; and the first reduction gears 62 and the second reduction gears 64 are opposite handed to cancel out axial forces on the compound reduction gears 70 that are associated with the transmission of rotary power between the input pinion 60 and the first reduction gears 62 and between the second reduction gears 64 and the final drive gear 66. While the transmission 44 has been described as employing helical gears, it will be appreciated that some or all of these gears could be constructed as spur gears.

With reference to FIG. 3, the differential assembly 46 can include a differential input member and a pair of differential output members. The differential input member can be coupled to the final drive gear 66 for rotation therewith about the output axis 76, while each of the differential output members can be coupled for rotation with a corresponding one of the output shafts 32. In the particular example provided, the differential assembly 46 includes a differential case 80 and a differential gearset 82. The differential case 80 can function as the differential input member and can be supported for rotation on the housing 40 about the output axis 76 by a pair of bearings 84. The bearings 84 are illustrated as being tapered roller bearings in the example provided, but it will be appreciated that bearings 84 could be configured as angular ball bearings or as ball bearings in the alternative. The differential gearset 82 can include a pair of differential pinions 90 and a pair of side gears 92. The differential pinions 90 can be received in the differential case 80 and are rotatably disposed on a cross-pin 94 that is mounted to the differential case 80. The cross-pin 94 can extend at least partly through the differential case 80 and is oriented perpendicular to the output axis 76. The side gears 92 are the differential output members in the example provided. The side gears 92 are received in the differential case 80 and are rotatable relative to the differential case 80 about the output axis 76. Each of the side gears 92 is meshingly engaged with the differential pinions 90.

Each of the output shafts 32 can be non-rotatably but axially slidably engaged to a corresponding one of the side gears 92. In the example provided, each of the output shafts 32 has a male-splined segment 100 that is matingly engaged to an internally splined aperture 102 in a corresponding one of the side gears 92. Each of the output shafts 32 is configured to transmit rotary power between one of the side gears 92 and an associated one of the vehicle wheels.

The drive unit 30 is configured to drive the differential output members (e.g., the side gears 92) and the output shafts 32 over a predetermined range of rotational speeds in which the predetermined range of rotational speeds has a predetermined maximum value or magnitude. The transmission 44 is configured such that when the drive unit 30 drives the differential output members at a rotational speed that is equal to the predetermined maximum magnitude, the motor output shaft 56 rotates at a rotational speed that is equal or greater than 19,000 rotations per minute, but a pitch line velocity between any meshing set of gears (i.e., between the drive gear 60 and the first reduction gears 62, or between the second reduction gears 64 and the driven gear 66 is less than or equal to 37 meters per second. Preferably, the pitch line velocity between each meshing set of gears is less than or equal to 37 meters per second when the rotational speed of the motor output shaft 56 is greater than or equal to 20,000 revolutions per minute, and more preferably greater than or equal to 22,000 revolutions per minute, and still more preferably greater than or equal to 24,000 revolutions per minute when the drive unit 30 is operated to drive the differential output members at the at a rotational speed that is equal to the predetermined maximum magnitude. Preferably, the pitch line velocity between each set of meshing gears is less than or equal to 35 meters per second when the drive unit 30 is operated to drive the differential output members at the at a rotational speed that is equal to the predetermined maximum magnitude (i.e., when the rotational speed of the motor output shaft 56 is greater than or equal any of the rotational speeds that is detailed in the above discussion). In view of the above remarks, the transmission 44 advantageously permits use of a motor assembly that is relatively small in size and which has an output capacity with a relatively low torque and a relatively high rotational speed (i.e., a relatively less expensive motor assembly). Moreover, the configuration of the transmission 44 is also significant due to the engagement of two gears (i.e., the second reduction gears 64) with the final drive gear 66. In this regard, the engagement of the two second reduction gears 64 with the final drive gear 66 reduces the load on the teeth of the final drive gear 66. Stated another way, the compound or twin gears 70, which are parallel to one another, share the load that is transmitted to the final drive gear 66. This permits all exterior dimensions of the final drive gear 66 to be reduced by a factor equal to the square root of the number 2 (i.e., by 26%) relative to a configuration where the final drive gear 66 is engaged by a single gear. This reduction in size can be extremely advantageous in reducing the overall size of transmission 44 so that it may be more easily packaged into a vehicle.

The configuration of the transmission 44 is advantageous in several aspects. For example, the compound reduction gears 70 permit the use of a relatively high-speed electric motor and a relatively small input pinion, which lowers the pitch line velocity and thus affects bending stress, load capacity and the service life of the input pinion 60 and the first reduction gears 62 in a positive manner. As another example, the loading on the final drive gear 66 is shared across the second reduction gears 64, which permits a reduction in the size of the second reduction gears 64 (as opposed to an arrangement where the entire load is transmitted into the final drive gear 66 by a single gear). Consequently, the arrangement of the gearing between the motor assembly 42 and the final drive gear 66 permits a reduction in the package size of the drive unit 30, and moreover, these gears can be formed relatively smaller and/or from less expensive materials than components of the known electric drive units to thereby reduce the cost and mass of the electric drive module 24.

If desired, a park-lock mechanism (not shown) can be incorporated into the electric drive module 24. With reference to FIGS. 2 and 4, the park-lock mechanism could be configured in a conventional manner with a pawl, which is pivotably coupled to the housing 40, a toothed locking wheel, which is rotatably coupled to the final drive gear 66 or to a component of the differential assembly 46 that is rotatable about the output axis 76. The pawl can be pivoted into and out of engagement with the teeth on the toothed locking wheel to inhibit rotation of the final drive gear 66 relative to the housing 40. Alternatively, the park-lock mechanism could be configured to selectively lock the countershafts 72 to the housing 40. A scissor mechanism or a teeter-totter lever mechanism could be employed to simultaneously lock the countershafts 72 to the housing 40.

Figure 5:
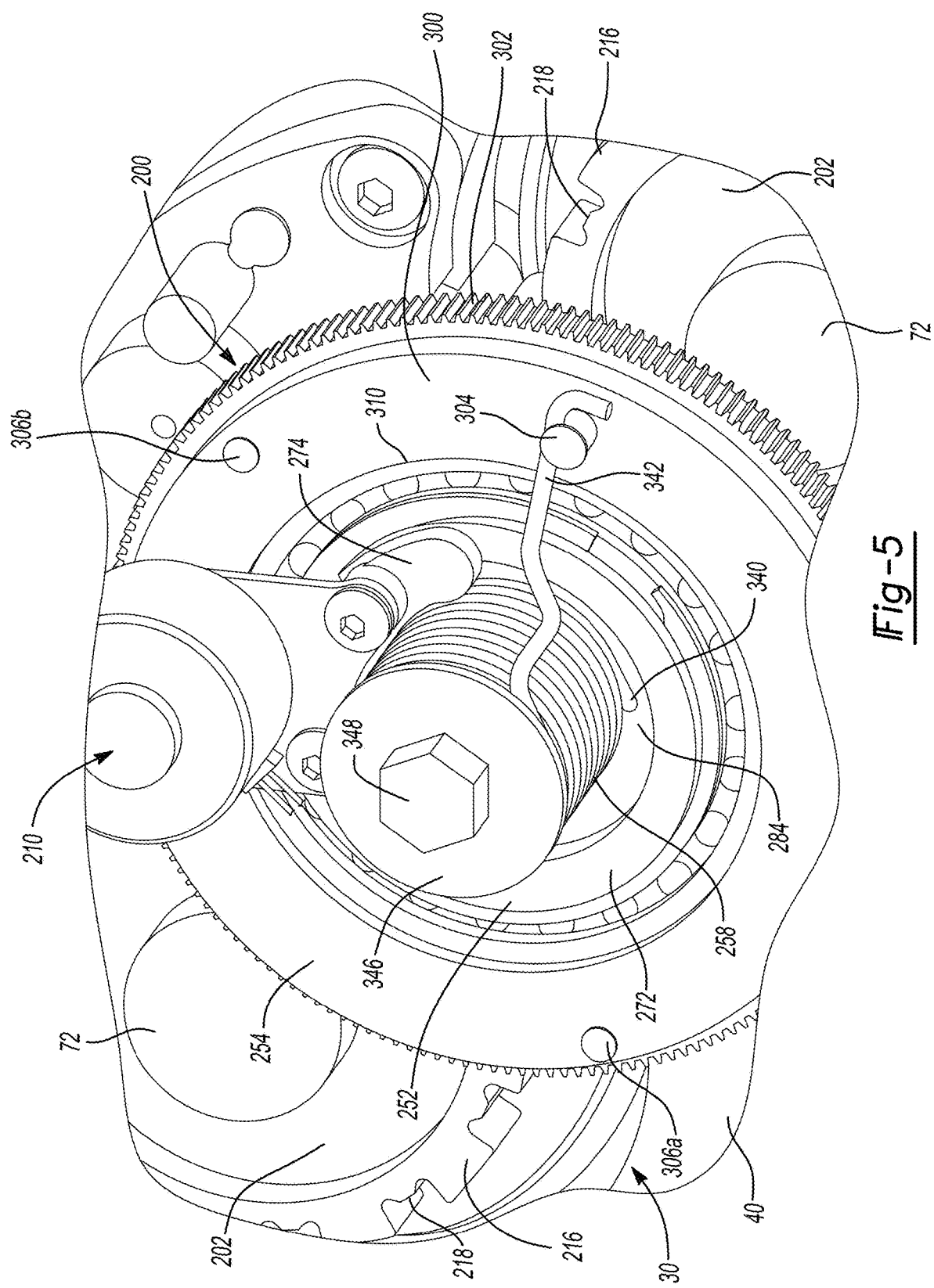
FIG. 5 is a perspective view of portion of the electric drive module of FIG. 1 illustrating an optional park lock mechanism.
Figure 6:
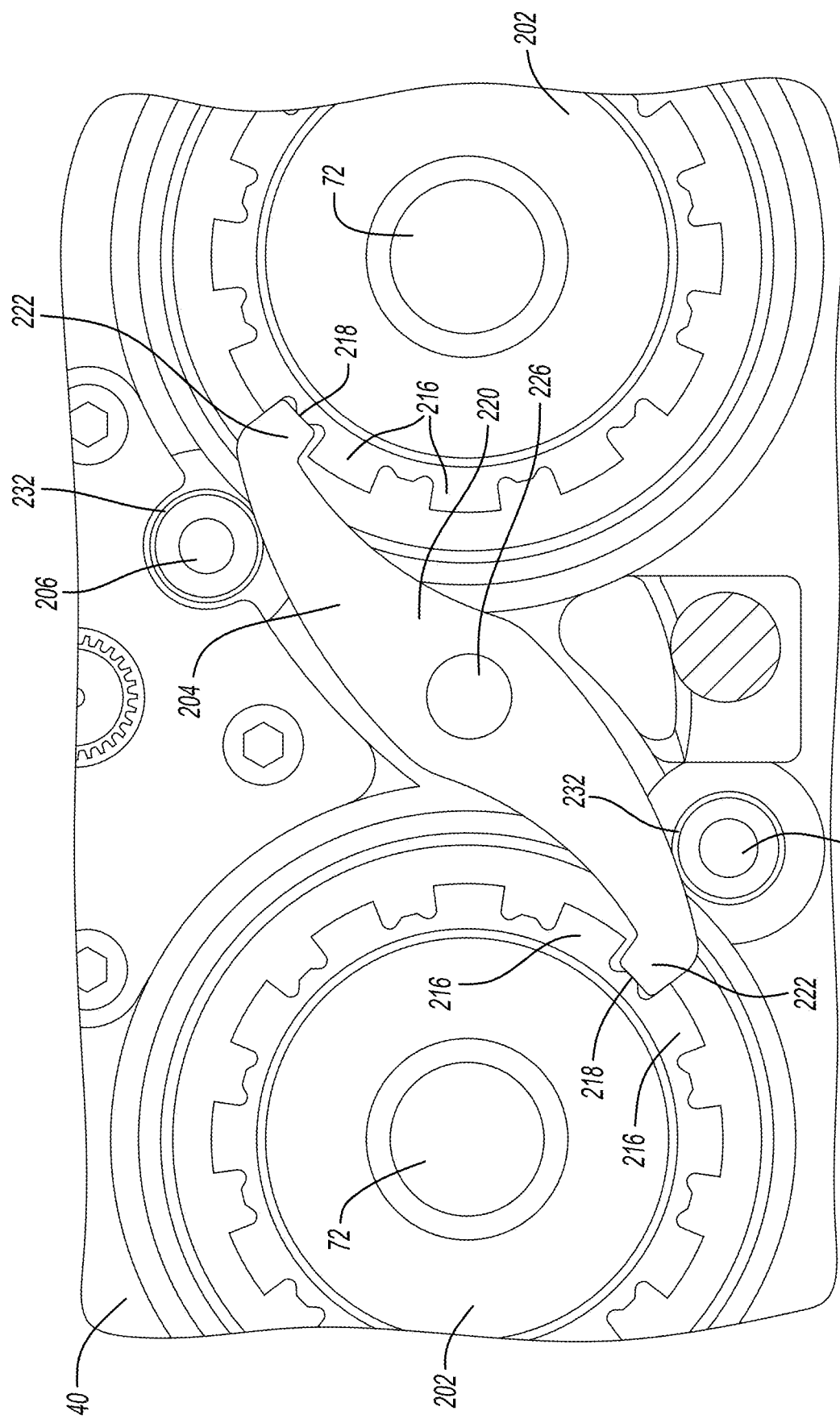
FIG. 6 is a plan view of a portion of the park lock mechanism illustrating a pawl disposed in engagement with a pair of park gears to immobilize the countershafts of the electric drive module.
Figure 7:
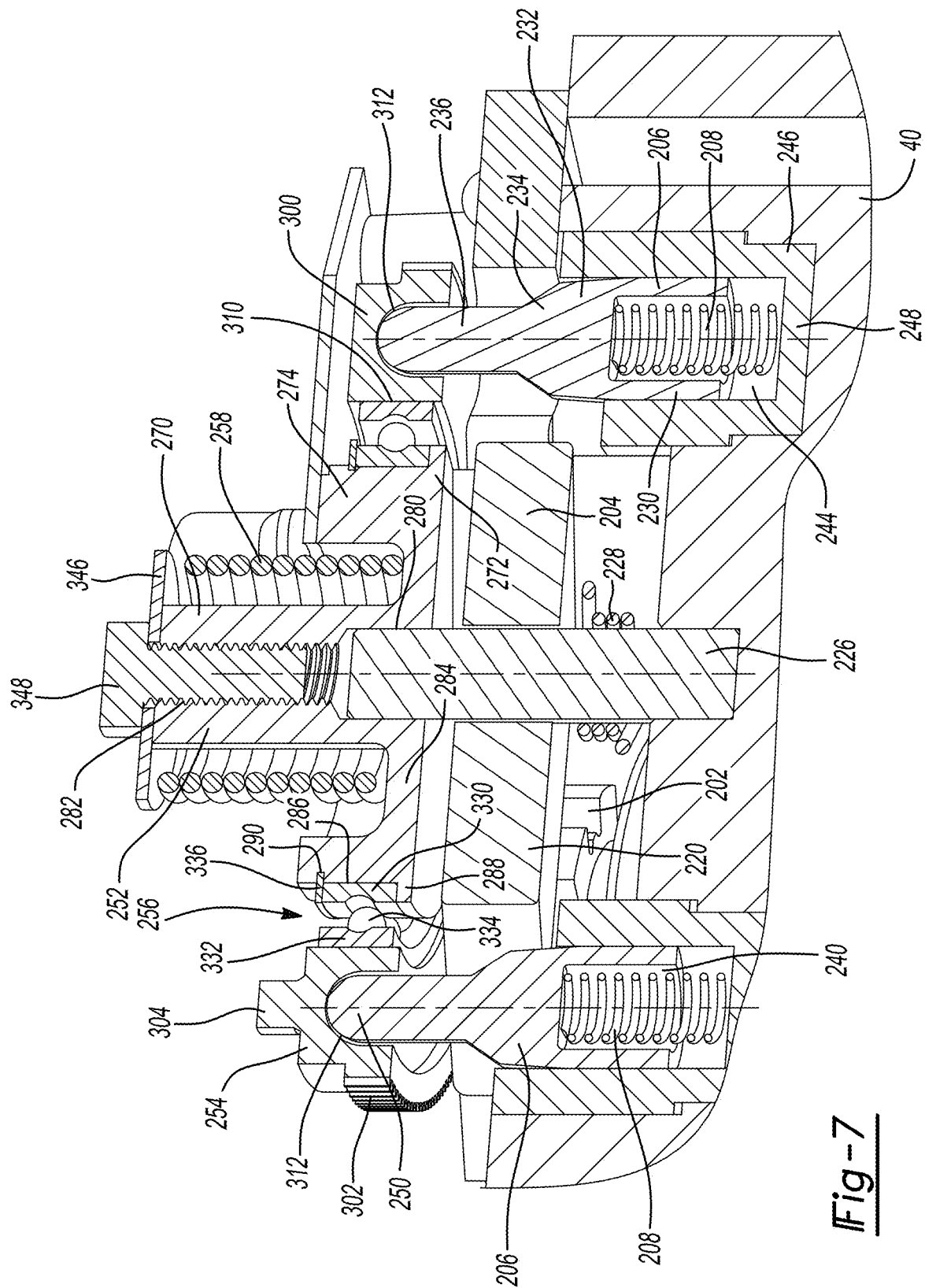
FIG. 7 is a sectional view taken through a portion of the park lock mechanism, the view illustrating a cam plate oriented in a first rotational position and a pair of plungers disposed in an extended position.

With reference to FIGS. 5 through 7, an optional park-lock mechanism 200 may be incorporated into the drive unit 30. The park-lock mechanism 200 can include a pair of park gears 202, a pawl 204, a pair of plungers 206, a pair of plunger biasing springs 208, and an actuator 210.

Each of the park gears 202 can be non-rotatably coupled to an associated one of the countershafts 72 and can define a plurality of teeth 216 and a plurality of valleys 218. Each of the valleys 218 is disposed between a respective pair of the teeth 216.

The pawl 204 includes a pawl body 220 and a pair of pawl teeth 222 that are disposed on the opposite ends of the pawl body 220. The pawl body 220 is pivotably coupled to the housing 40 of the drive unit 30 so that the pawl 204 can be moved between an engaged position (FIG. 6), in which each of the pawl teeth 222 engages an associated one of the park gears 202 (i.e., each pawl tooth 222 is received into a valley 218 in an associated one of the park gears 202) to thereby rotationally lock the park gears 202 and the countershafts 72 to the housing 40, and a disengaged position (FIG. 8) in which each pawl tooth 222 clears the teeth 216 on the associated one of the park gears 202 so that the pawl 204 does not inhibit rotation of the park gears 202 or the countershafts 72 relative to the housing 40. In the example provided, a pivot axle 226 is mounted to the housing 40 and extends through the pawl 204 and into the actuator 210. The pawl 204 can be received somewhat loosely on the pivot axle 226 to ensure that the load transmitted through the park-lock mechanism 200 is shared equally by the park gears 202, as well as equally by the pawl teeth 222. The pawl 204 can be biased about the pivot axle 226 toward a desired rotational position, such as the disengaged position. In the example provided, a helical torsion spring 258 is disposed about the pivot axle 226 and is engaged to the housing 40 and to the pawl body 220.

With reference to FIG. 7, each of the plungers 206 can have a plunger body with a guide portion 230, a first body portion 232, a transition portion 234, and a second body portion 236. The guide portion 230 can be disposed on a first axial end of the plunger 206 and can be cylindrically shaped with a first diameter. The first body portion 232 can be disposed between the guide portion 230 and the transition portion 234 and can be sized in a desired manner. For example, the first body portion 232 could be generally cylindrically shaped having a desired diameter, such as the first diameter. In the example provided, the first body portion 232 is frusto-conically shaped, having a base (where the first body portion 232 intersects the guide portion 230) with a diameter that is equal to the first diameter and a relatively shallow cone angle that causes the exterior surface of the first body portion 232 to taper inwardly toward the central axis of the plunger 206 between the guide portion 230 and the transition portion 234 by a desired amount, such as 2 degrees to 30 degrees, preferably 5 degrees to 15 degrees.

The second body portion 236 can also be cylindrically shaped but has a second diameter that is smaller than the first diameter. The transition portion 234 can be frusto-conically shaped so as to taper between the first and second body portions 232 and 236. A spring aperture 240 can be formed in the first axial end of the plunger 206 and is sized to receive a corresponding one of the plunger biasing springs 208 therein. In the example provided, each of the plunger biasing springs 208 is a helical coil compression spring, but it will be appreciated that other types of springs could be used instead of or in addition to a helical coil compression spring.

Each plunger 206 and plunger biasing spring 208 is received into a plunger aperture 244 in the housing 40. In the example shown, the housing 40 includes an optional pair of plunger bushings 246 that can be formed of a suitable material, such as hardened steel. Each of the plunger bushings 246 defines a plunger aperture 244 that is sized to receive the first body portion 232 of a corresponding one of the plungers 206 and a corresponding one of the plunger biasing springs 208. The plunger aperture 244 can be a blind hole so that the plunger bushing 246 defines an interior wall 248 against which an end of the corresponding one of the plunger biasing springs 208 can abut.

Figure 8:
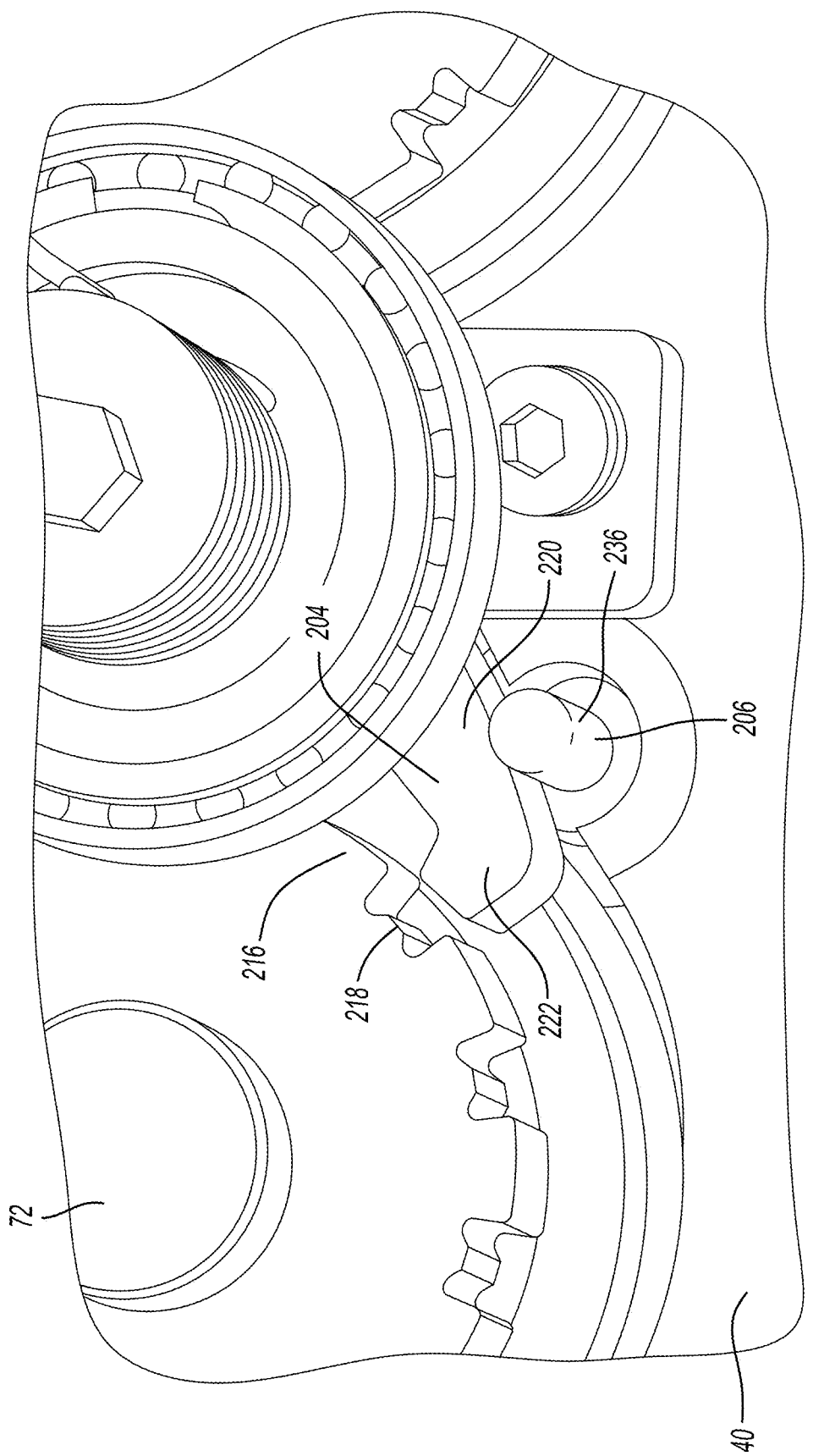
FIG. 8 is perspective view of a portion of the park lock mechanism illustrating the pawl disengaged from a pair of park gears to permit rotation of the countershafts of the electric drive module.
Figure 9:
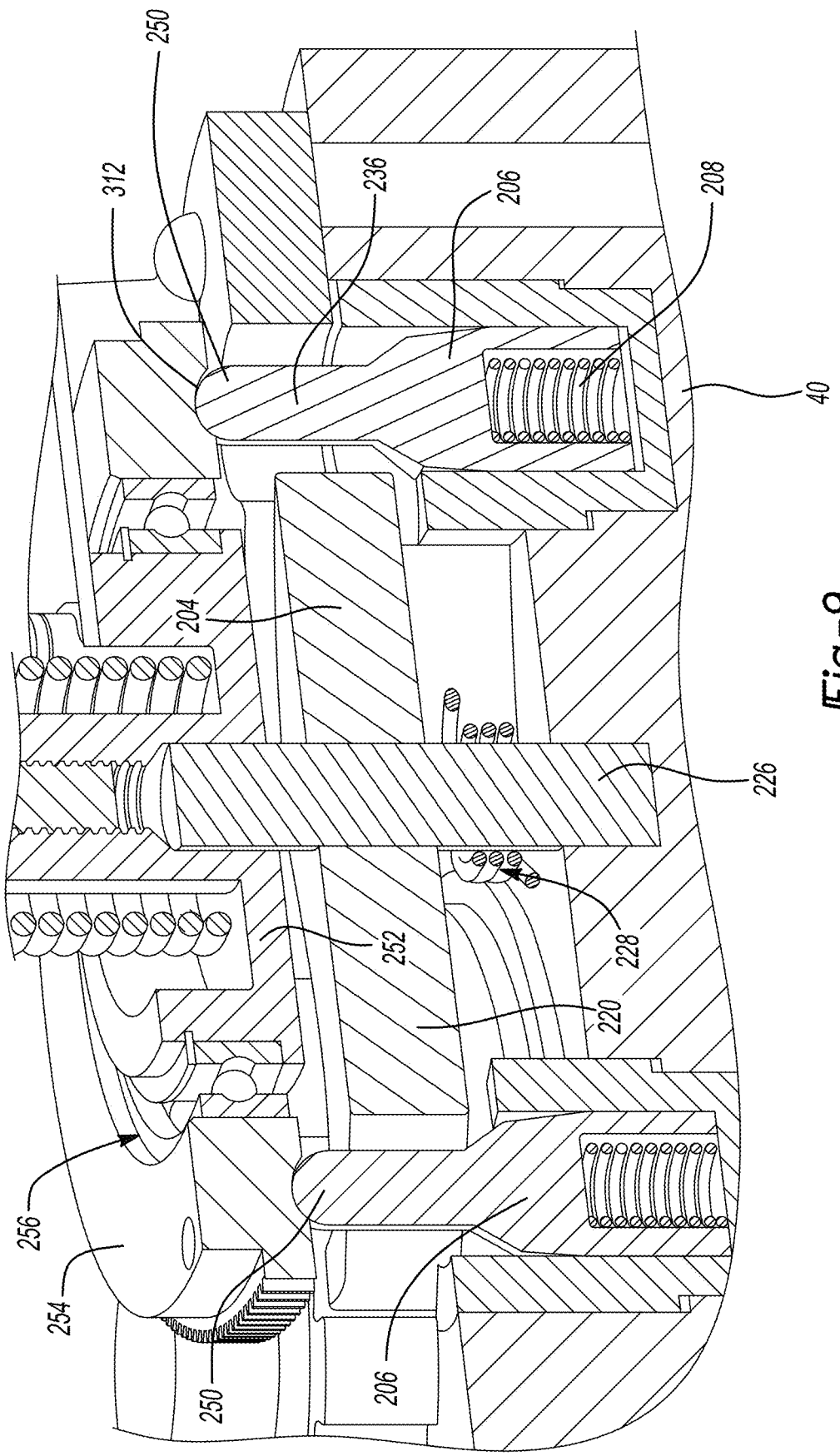
FIG. 9 is a sectional view taken through a portion of the park lock mechanism, the view illustrating the cam plate oriented in a second rotational position and a pair of plungers disposed in a retracted position.

Each of the plungers 206 is movable along its longitudinal axis relative to the housing 40 between an extended position (shown in FIGS. 6 & 7) in which the first body portion 232 of each of the plungers 206 is disposed in a rotational path of the pawl body 220, and a retracted position (shown in FIGS. 8 & 9). To position the plungers 206 in the extended position, the pawl teeth 222 must be engaged to the park gears 202. If the exterior surface of the first body portion 232 is tapered (frusto-conical), the plunger biasing springs 208 will urge the plungers 206 outwardly from the plunger apertures 244 such that the exterior surface of the first body portion 232 of each plunger 206 contacts the pawl body 220. When the plungers 206 are disposed in their retracted positions, the pawl 204 can be rotated via the torsion spring 258 to the disengaged position. The pawl 204 can contact the second body portion 236 of one or both of the plungers 206 when the pawl 204 is in the disengaged position.

Figure 10:
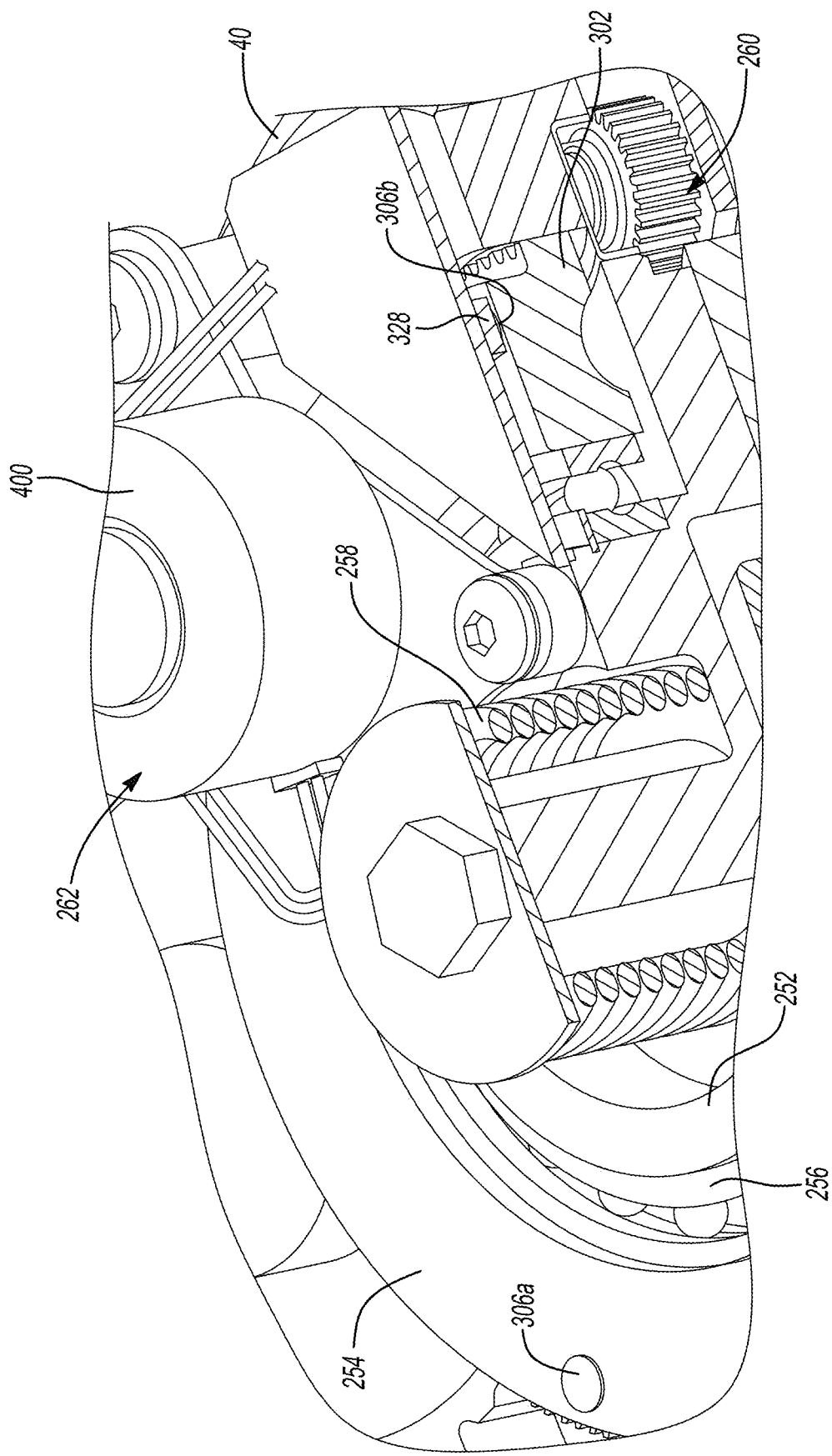
FIG. 10 is a partially sectioned perspective view of the park lock mechanism.

With reference to FIGS. 7 and 10, the actuator 210 is configured to control movement of the plungers 206 between the extended and retracted positions. The actuator 210 can include a pair of cam followers 250, an actuator hub 252, a cam plate 254, a bearing 256, a torsion spring 258, a rotary actuator 260, and a lock actuator 262.

With reference to FIGS. 7 and 9, each of the cam followers 250 can be disposed in-line with an associated one of the plungers 206. In the example provided, each of the cam followers 250 is unitarily and integrally formed with an associated one of the plungers 206. More specifically the cam follower 250 can be a spherical radius on a second axial end of the plunger 206 that is opposite the first axial end.

The actuator hub 252 can be fixedly coupled to the housing 40 concentrically about the axis about which the pawl 204 pivots. In the example provided, the actuator hub 252 is press-fit to the pivot axle 226. The actuator hub 252 can include a central portion 270, a bearing mount 272 and a lock actuator mount 274. The central portion 270 can define a pivot axle aperture 280 and a threaded aperture 282 that are aligned along a common axis. The pivot axle aperture 280 is formed through a first axial side of the central portion 270 and sized to engage the pivot axle 226 in a press-fit manner. The threaded aperture 282 is formed through a second, opposite axial side of the central portion 270. The bearing mount 272 is disposed concentrically about the central portion 270 and can be coupled to the central portion 270 through a flange member 284 or alternately, through a plurality of spokes or webs. The bearing mount 272 has an exterior circumferential surface 286, a shoulder 288 that extends radially outwardly from the exterior circumferential surface, and a retaining ring groove 290 that is formed into the exterior circumferential surface 286. The lock actuator mount 274 can have a reniform (i.e., kidney bean) shape, which is best seen in FIG. 5, and can be fixedly coupled to (e.g., unitarily formed with) the bearing mount 272 so as to be radially offset from the central portion 270.

Figure 11:
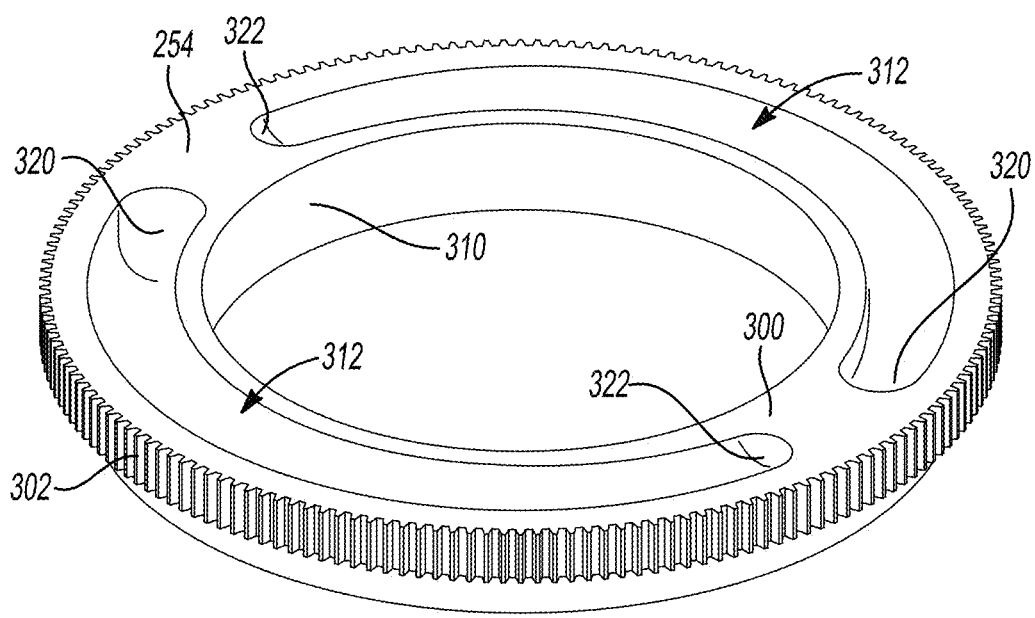
FIG. 11 is a perspective view of a portion of the park lock mechanism illustrating a first face of the cam plate in more detail.

With reference to FIGS. 5, 7 and 11, the cam plate 254 can comprise an annular plate 300, a gear portion 302, a torsion spring mount 304 and a pair of sensor targets 306a, 306b. The annular plate 300 can formed of a suitable material. The annular plate 300 can have an interior circumferential surface 310 and can define a pair of cams 312. Each of the cams 312 is formed into a first face of the annular plate 300 that faces toward the cam followers 250 and the plungers 206. Each of the cams 312 can be a circumferentially extending groove in the first face of the annular plate 300. Each of the cams 312 can taper between a first circumferential end 320 (FIG. 11) of the groove, where the groove is deepest, and a second, opposite circumferential end 322 (FIG. 11) of the groove where the groove is shallowest. Each of the cam followers 250 can be received into a corresponding one of the cams 312 (i.e., grooves) so that rotation of the cam plate 254 about an axis about which the pawl 204 pivots causes corresponding linear motion of the plungers 206. More specifically, placement of a cam follower 250 into the deepest part of an associated one of the cams 312 (i.e., the first circumferential end 320 of the groove that forms the associated one of the cams 312) as shown in FIG. 7 permits a corresponding one of the plunger biasing springs 208 to urge the associated one of the plungers 206 into its extended position, while placement of a cam follower 250 in the shallowest part of an associated one of the cams 312 (i.e., the second circumferential end of the groove that forms the associated one of the cams 312) as shown in FIG. 9 positions a corresponding one of the plungers 206 in its retracted position against the bias of the corresponding one of the plunger biasing springs 208. The gear portion 302 can include a plurality of gear teeth that can be fixedly coupled to the annular plate 300 such that gear teeth are concentric with the interior circumferential surface 310. In the example provided, the gear teeth are unitarily and integrally formed with the annular plate 300. The gear teeth can be disposed about the entire circumference of the annular plate 300, as is shown in the example provided, or could be formed about a sector of the annular plate 300. The torsion spring mount 304 can be a cylindrical post or projection that can extend from a second face of the annular plate 300 that is opposite the first face. Each of the sensor targets 306a, 306b can be mounted to the annular plate 300 and is configured to be sensed by a sensor 328 (FIG. 10) when the cam plate 254 is in a predetermined rotational position relative to the housing 40. In the example provided, each of the sensor targets 306a, 306b is a magnet and the sensor 328 is a Hall-effect sensor that is coupled to the housing 40.

With reference to FIG. 7, the bearing 256 is configured to support the cam plate 254 for rotation relative to the actuator hub 252. The bearing 256 can include an inner bearing race 330, an outer bearing race 332, and a plurality of bearing elements 334 that are received between the inner and outer bearing races 330 and 332. The inner bearing race 330 can be received onto the exterior circumferential surface 286 of the bearing mount 272 and abutted against the shoulder 288. If desired, the inner bearing race 330 can be press-fit to the exterior circumferential surface 286 of the bearing mount 272. An external retaining ring 336 can be received into the retaining ring groove 290 and can inhibit axial movement of the inner bearing race 330 on the actuator hub 252 in a direction away from the shoulder 288. The outer bearing race 332 can be coupled to the cam plate 254 in any desired manner. For example, the outer bearing race 332 could be press-fit or adhesively bonded to the interior circumferential surface 310 of the annular plate 300. Alternatively, in instances where the annular plate is formed of a plastic material, the annular plate 300 could be overmolded onto the outer bearing race 332 such that the outer bearing race 332 is cohesively bonded to the annular plate 300.

With reference to FIGS. 5 and 7, the torsion spring 258 can be wound about the central portion 270 and can have a first tang 340, which can react against the actuator hub 252, and a second tang 342 that can react against the torsion spring mount 304 on the cam plate 254. In the example provided, the first tang 340 is received into a hole that is formed in the flange member 284. The torsion spring 258 can be secured to the central portion 270 via a washer 346 and a threaded fastener 348 that is threaded to the threaded aperture 282 in the central portion 270. The torsion spring 258 is configured to rotationally bias the cam plate 254 about its rotational axis toward a first rotational position, which can be a position that orients the deepest part of the cams 312 to the cam followers 250. Alternatively, the torsion spring 258 could be configured to rotationally bias the cam plate 254 about its rotational axis into a position where the shallowest part of the cams 312 is oriented to the cam followers 250.

With reference to FIG. 10, the rotary actuator 260 is configured to control rotation of the cam plate 254 about its rotational axis between the first rotational position and a second rotational position. The rotary actuator 260 can include a rotary electric motor (not specifically shown) and an output pinion (not specifically shown) that is meshingly engaged to the gear teeth of the gear portion 302 of the cam plate 254. The electric motor can be coupled (e.g., mounted) to the housing 40. The output pinion can be driven by the electric motor, either directly (e.g., the output pinion is mounted on an output shaft of the electric motor), or through a transmission (not shown) having one or more gears (not shown) that are disposed in a power transmission path between the electric motor and the output pinion.

The electric motor can be operated to drive the cam plate 254 to the second rotational position, which can be a position that orients an opposite circumferential end of the cams 312, such as the shallowest part of the cams 312, to the cam followers 250. In some forms, the electric motor can be employed to drive the cam plate 254 into the desired rotational position and to thereafter hold the cam plate 254 in this rotational position. Optionally, the cam plate 254 can be configured with a stop member (not shown) that abuts a mating stop member (not shown) that is coupled to the housing 40 when the electric motor rotates or drives the cam plate 254 into the desired rotational position. In the example provided, however, the sensor target 306b, the sensor 328 and the lock actuator 262 are employed to maintain the cam plate 254 in the desired rotational position so that electric power to the electric motor need not be maintained.

Placement of the cam plate 254 into each of the first and second rotational positions can be sensed by the sensor 328, and the sensor 328 can responsively generate a corresponding sensor signal. For example, placement of the cam plate 254 in the first rotational position orients the sensor target 306a to the sensor 328 and the sensor 328 responsively generates a first sensor signal, while placement of the cam plate 254 in the second rotational position orients the sensor target 306b to the sensor 328 and the sensor 328 responsively generates a second sensor signal. In response to receipt of the second sensor signal, a controller (not shown) can control the lock actuator 262 to engage the lock actuator 262 to the cam plate 254 to inhibit rotation of the cam plate 254 out of the second rotational position (i.e., due to the moment applied to the cam plate 254 by the torsion spring 258).

Figure 12:
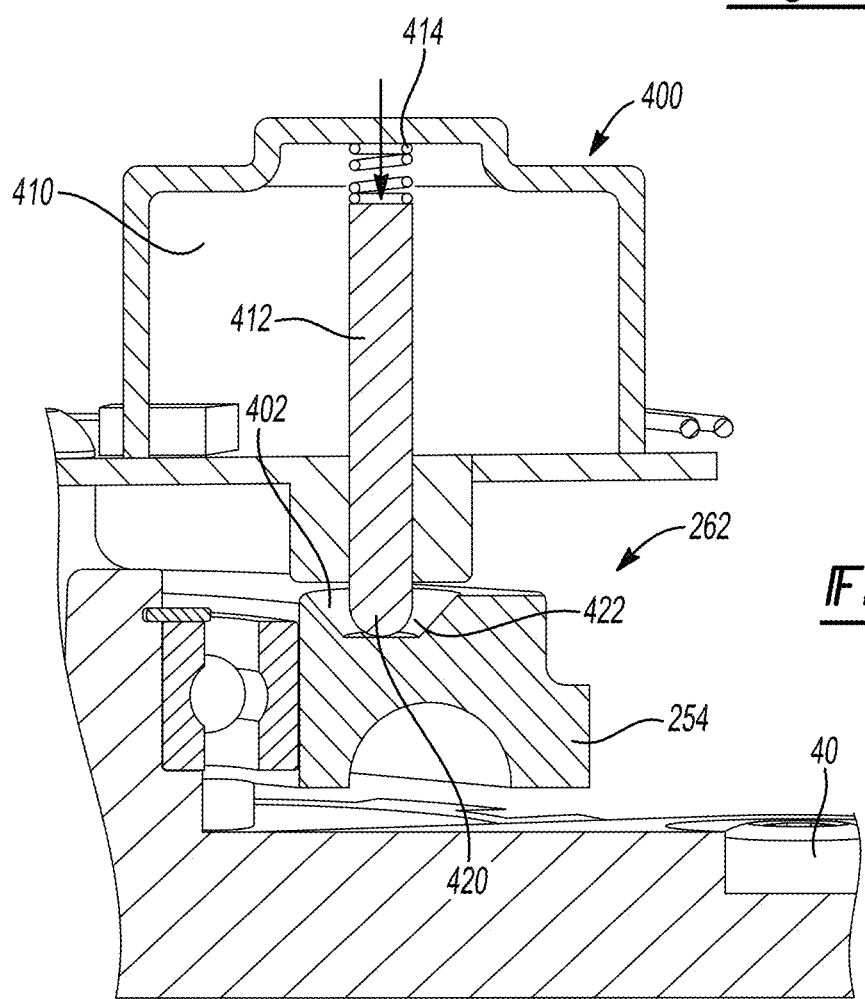
FIG. 12 is a section view of a portion of the park lock mechanism illustrating a lock actuator in more detail.
Figure 13:
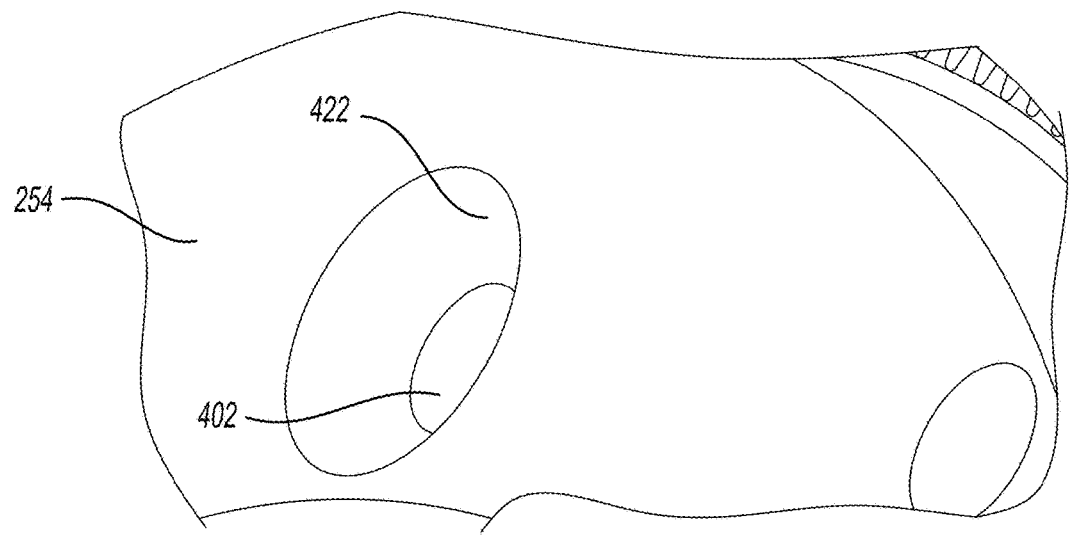
FIG. 13 is a perspective view of a portion of the cam plate illustrating a lock aperture formed in a second face of the cam plate.
Figure 14:
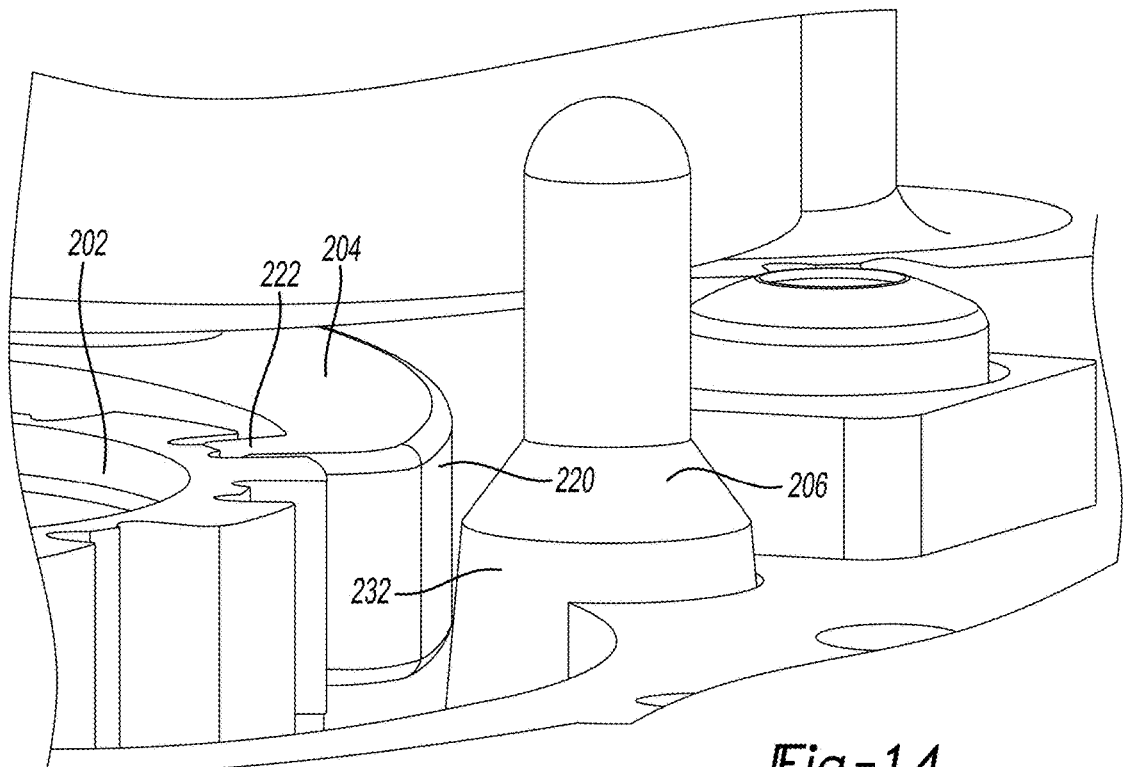
FIG. 14 is perspective view of a portion of the park lock mechanism illustrating the plungers in the extended position and the pawl in the engaged position.

With reference to FIGS. 10 and 12, the lock actuator 262 can comprise any means for inhibiting rotation of the cam plate 254 relative to the housing 40. In the example provided, the lock actuator 262 comprises a solenoid assembly 400 and a lock aperture 402. The solenoid assembly 400 can be coupled to the housing 40 and can include a solenoid 410, a solenoid plunger 412 and a solenoid spring 414. The solenoid plunger 412 is movable in the solenoid 410 between an extended or latched position, and a retracted or unlatched position. The solenoid spring 414 biases the solenoid plunger 412 into the extended or latched position. The lock aperture 402 is formed in the second face of the annular plate 300 and is configured to receive the solenoid plunger 412 therein when the cam plate 254 is in the second rotational position. In the example shown, the solenoid plunger 412 has a tip 420 that is defined by a spherical radius, and the lock aperture 402 has a frusto-conically-shaped sidewall 422. The contour of the tip 420 of the solenoid plunger 412 and the sidewall 422 of the lock aperture 402 permits the solenoid plunger 412 to be driven toward the retracted or unlatched position via the torsion spring 258 when electric power is not provided to the solenoid 410 or to the electric motor.

With reference to FIGS. 5, 7 and 12, when electrical power is not provided to the electric motor or the solenoid 410 during the operation of the drive unit 30, the torsion spring 258 biases the cam plate 254 into the first rotational position where the deepest part of the cams 312 are aligned to the cam followers 250 as shown in FIG. 7 so that the plungers 206 are disposed in their extended positions such that the first body portions 232 contact the pawl body 220 and the pawl 204 is disposed about the pivot axle 226 such that the pawl teeth 222 engage the park gears 202 as shown in FIG. 6. In this condition, the countershafts 72 are effectively non-rotatably locked to the housing 40 and due to the configuration of the park-lock mechanism 200, the load transmitted through each pawl tooth 222 and each park gear 202 is equal. In this condition, the sensor target 306a is aligned to the sensor 328, so that the sensor 328 generates responsively generates the first sensor signal. The first sensor signal can be received by a controller (not shown) and employed to determine that the cam plate 254 is in a rotational position that causes the park-lock mechanism 200 to lock the countershafts 72 to the housing 40. The solenoid spring 414 of the lock actuator 262 biases the tip 420 of the solenoid plunger 412 against the second face of the annular plate 300.

To unlock the countershafts 72 from the housing 40 to permit rotation of the countershafts 72 relative to the housing 40, electrical power can be applied to the electric motor to drive the output pinion to cause corresponding rotation of the cam plate 254 about its rotational axis in a first rotational direction. Rotation of the cam plate 254 in the first rotational direction aligns progressively shallower portions of the grooves or cams 312 to the cam followers 250 as shown in FIG. 9, causing the plungers 206 to move from their extended positions toward their retracted positions. Due to the tapered configurations of the first body portion 232 and the transition portion 234 of the plungers 206, as well as the moment that is applied to the pawl 204 by the torsion spring 258, the pawl teeth 222 are progressively moved away from the teeth 216 of the park gears 202 as the plungers 206 move progressively toward their retracted positions. Placement of the pawl 204 in contact with the second body portions 236 of the plungers 206 as shown in FIGS. 8 and 9 positions the pawl teeth 222 away from the park gears 202 at a location where the park gears 202, and consequently the countershafts 72, are able to rotate freely relative to the housing 40. Further rotation of the cam plate 254 in the first rotational direction positions the cam plate 254 in the second rotational position, which orients the sensor target 306b to the sensor 328 so that the sensor 328 responsively generates the second sensor signal. In response to receipt of the second sensor signal, the controller can provide electrical power to the solenoid 410 to drive the solenoid plunger 412 into the lock aperture 402 and to hold the solenoid plunger 412 in this position. Optionally, the controller can also terminate the supply of electric power to the motor. The moment that is applied to the cam plate 254 by the torsion spring 258 to urge the cam plate 254 toward the first rotational position is insufficient to force the solenoid plunger 412 out of the lock aperture 402 when electrical power is supplied to the solenoid 410.

To re-lock the countershafts 72 to the housing 40 to inhibit rotation of the countershafts 72 relative to the housing 40, the supply of electric power to the solenoid 410 is terminated. The moment that is applied to the cam plate 254 by the torsion spring 258 to urge the cam plate 254 toward the first rotational position is sufficient to overcome the force that is applied to the solenoid plunger 412 by the solenoid spring 414 and force the solenoid plunger 412 out of the lock aperture 402. The moment applied to the cam plate 254 by the torsion spring 258 causes the cam plate 254 to rotate in a second rotational direction that is opposite the first rotational direction. Rotation of the cam plate 254 in the second rotational direction can cause the gear teeth of the gear portion 302 to back-drive the output pinion as the cam plate 254 rotates toward and into the first rotational position. Rotation of the cam plate 254 in the second rotational direction also aligns progressively deeper portions of the grooves or cams 312 to the cam followers 250, causing the plungers 206 to move from their retracted positions to their extended positions. Due to the tapered configurations of the transition portion 234 and the first body portion 232 of each of the plungers 206, contact between the pawl body 220 and the plungers 206 when the cam plate 254 is rotated in the second rotational direction drives the pawl 204 about the pivot axle 226 so that the pawl teeth 222 are rotated toward their respective park gear 202. The pawl teeth 222 are able to move directly into valleys 218 in the park gears 202 in situations where the park gears 202 are oriented in receptive positions. In other situations, movement of the pawl teeth 222 into valleys 218 may be blocked because the park gears 202 are oriented into positions where each pawl tooth 222 contacts a tooth of an associated one of the park gears 202. However, the plunger biasing springs 208 provide compliance that drives the plungers 206 into their extended positions (where the exterior surfaces of the first body portions 232 engage the pawl 204 and thereby drive the pawl teeth 222 into engagement with the park gears 202) when the countershafts 72 are rotated slightly.

Figure 15:
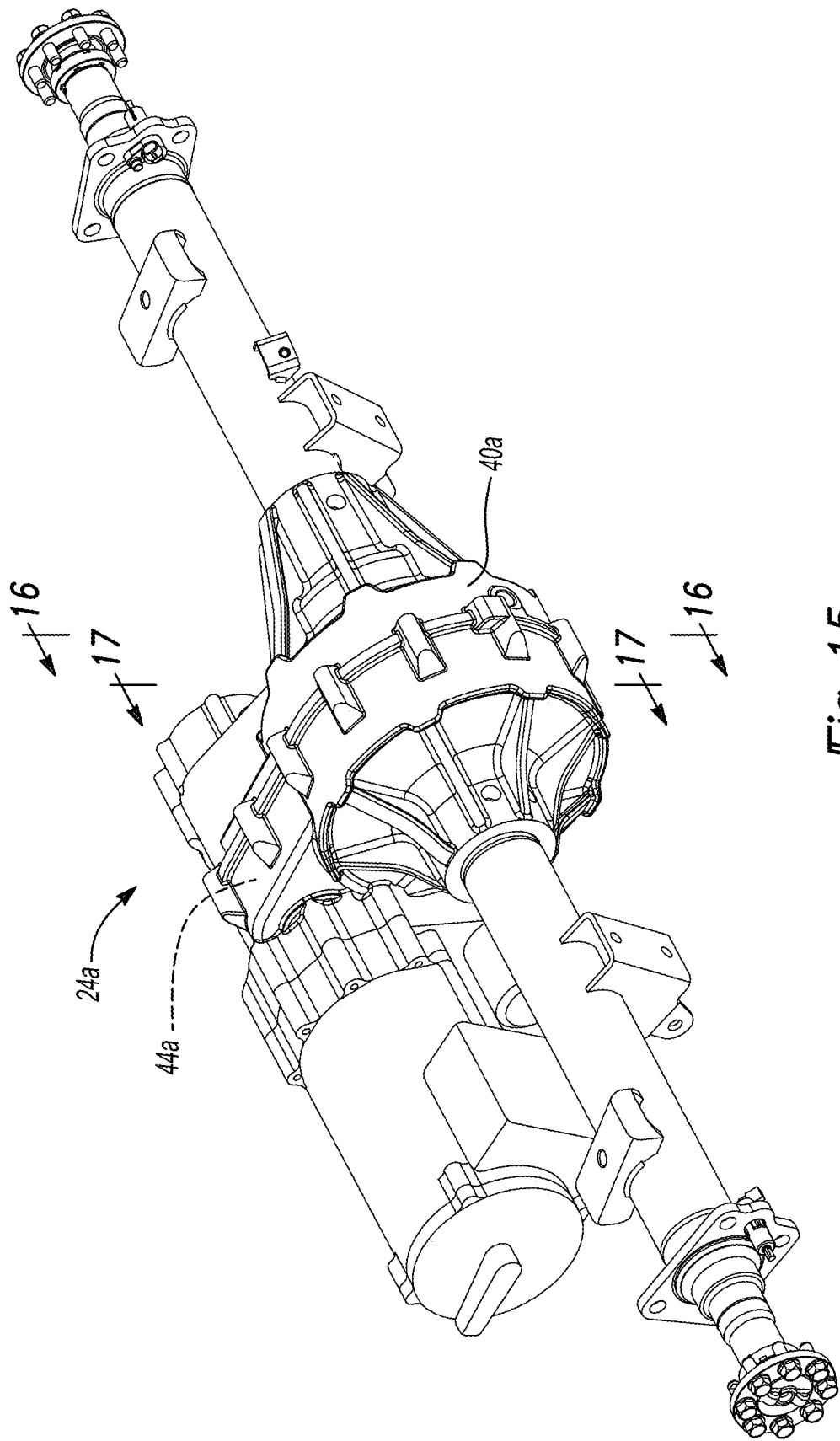
FIG. 15 is a perspective view of another electric drive module constructed in accordance with the teachings of the present disclosure.
Figure 16:
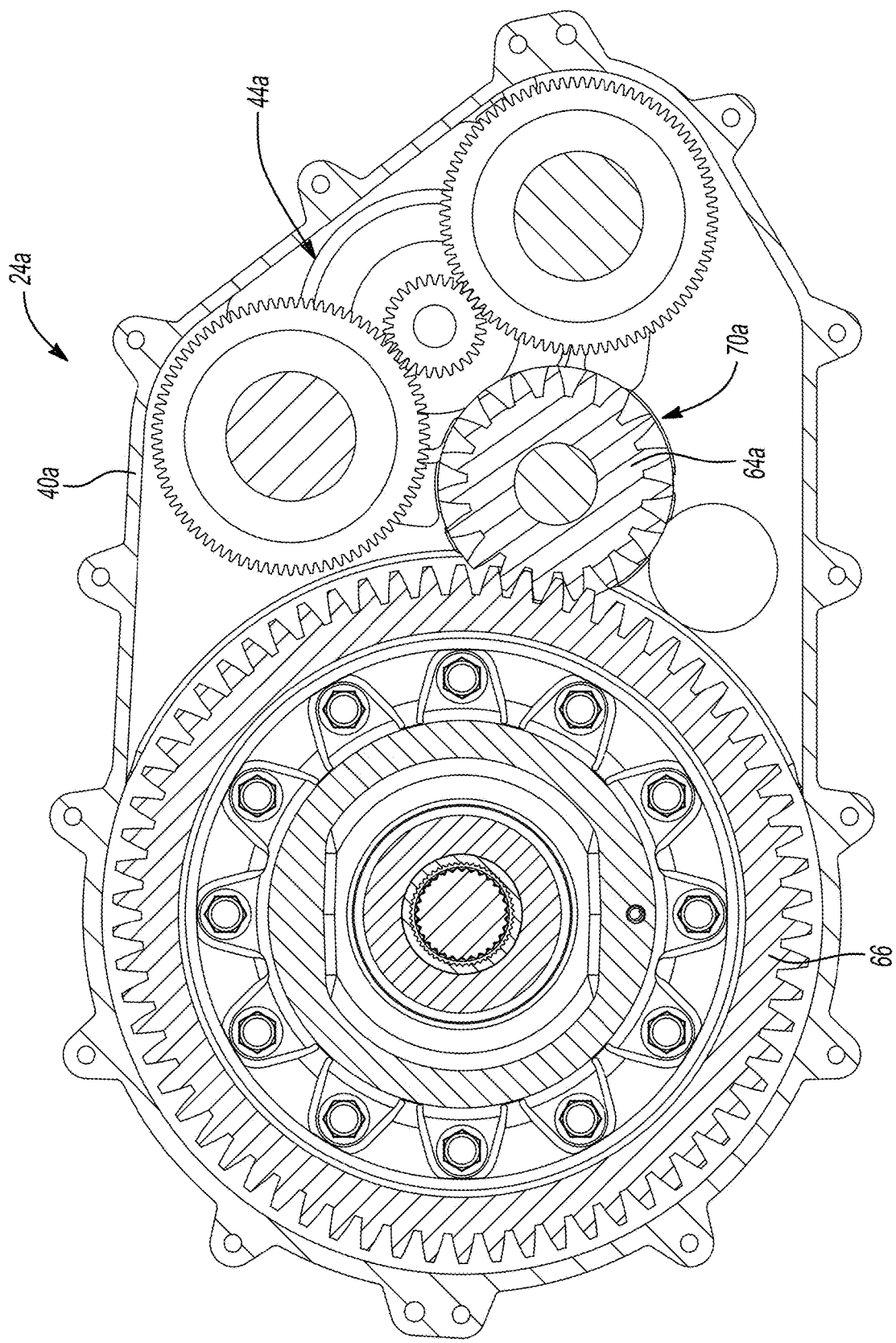
FIG. 16 is a section view taken along the line 16-16 of FIG. 15.
Figure 17:
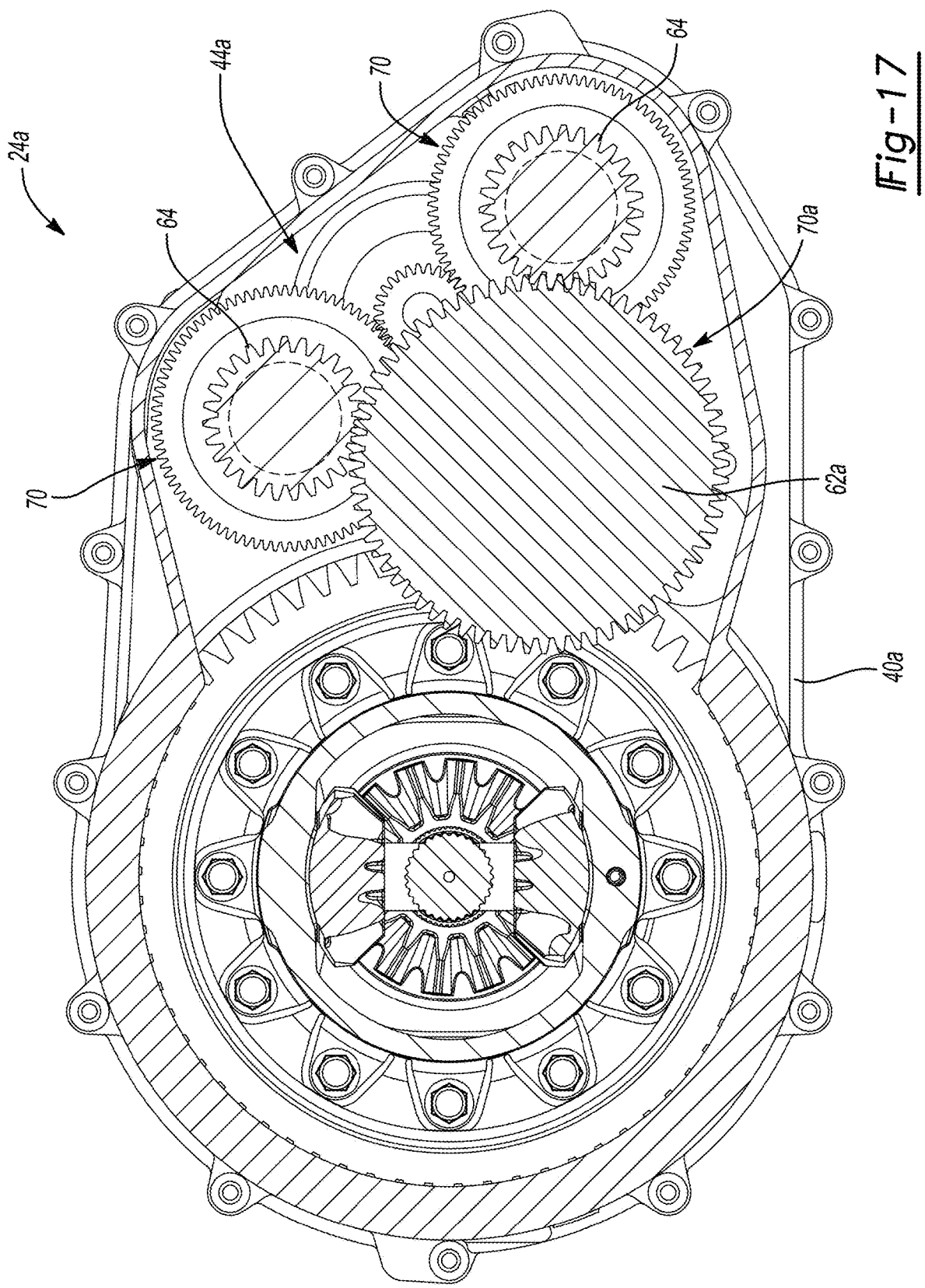
FIG. 17 is a section view taken along the line 17-17 of FIG. 15.

With reference to FIGS. 15 through 17, another electric drive module constructed in accordance with the teachings of the present disclosure is generally indicated by reference numeral 24a. The electric drive module 24a is generally similar to the electric drive module 24 (FIG. 1) that is described in detail above, except for the configuration of the transmission 44a and for modifications to the housing 40a to accommodate the transmission 44a. The transmission 44a employs a further reduction between the second reduction gears 64 and the final drive gear 66 so that the second reduction gears 64 do not directly mesh with the final drive gear 66. More specifically, the transmission 44a includes a second compound gear 70a, which has a third reduction gear 62a, which is meshingly engaged to the second reduction gears 64 of the compound reduction gears 70, and a fourth reduction gear 64a that is non-rotatably coupled to the third reduction gear 62a and meshingly engaged with the final drive gear 66. It will be appreciated that each of the compound gears 70 and 70a can be supported rotationally and axially relative to the housing 40a by pair of bearings (not shown).

Figure 18:
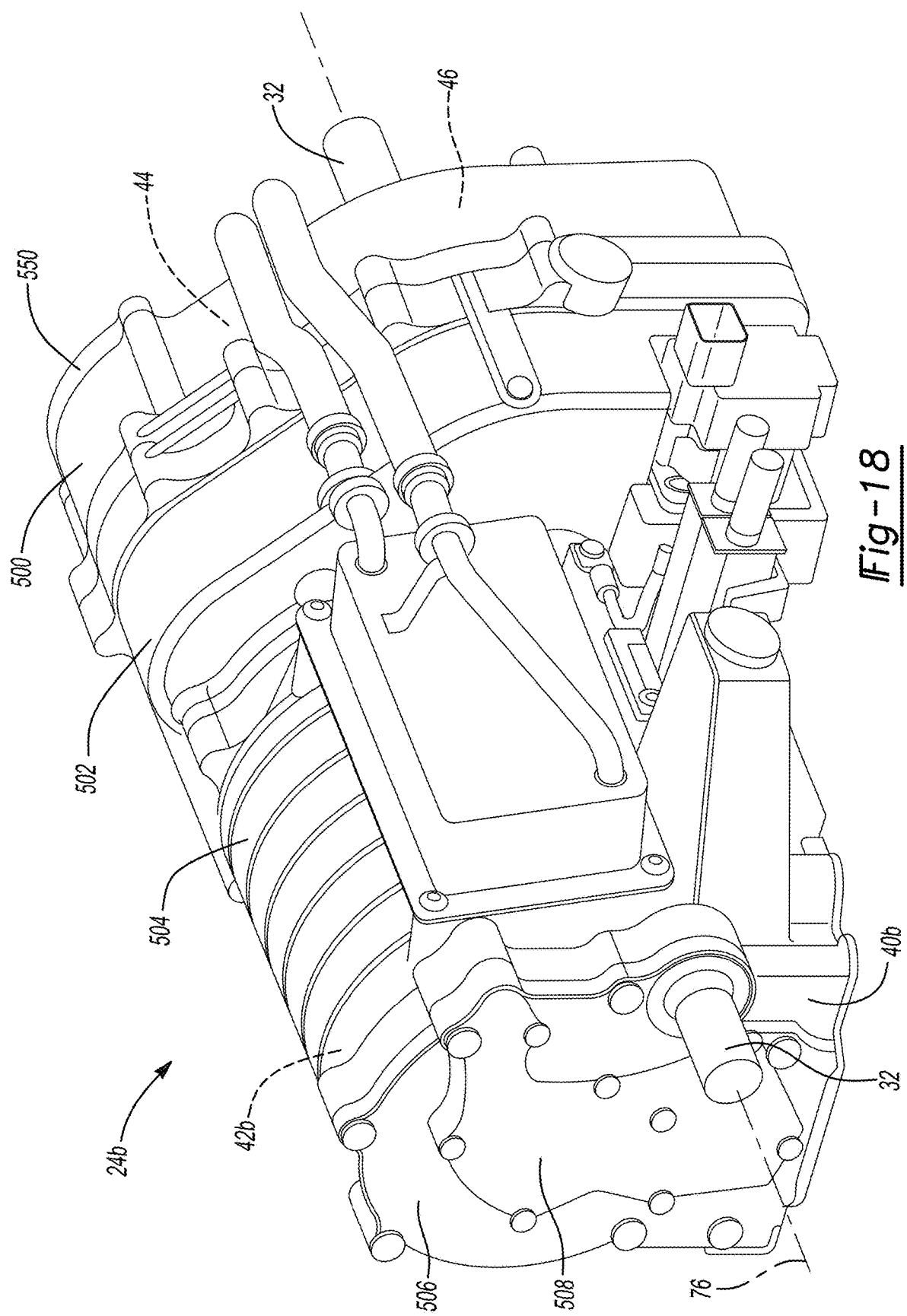
FIG. 18 is a perspective view of still another electric drive module constructed in accordance with the teachings of the present disclosure.
Figure 19:
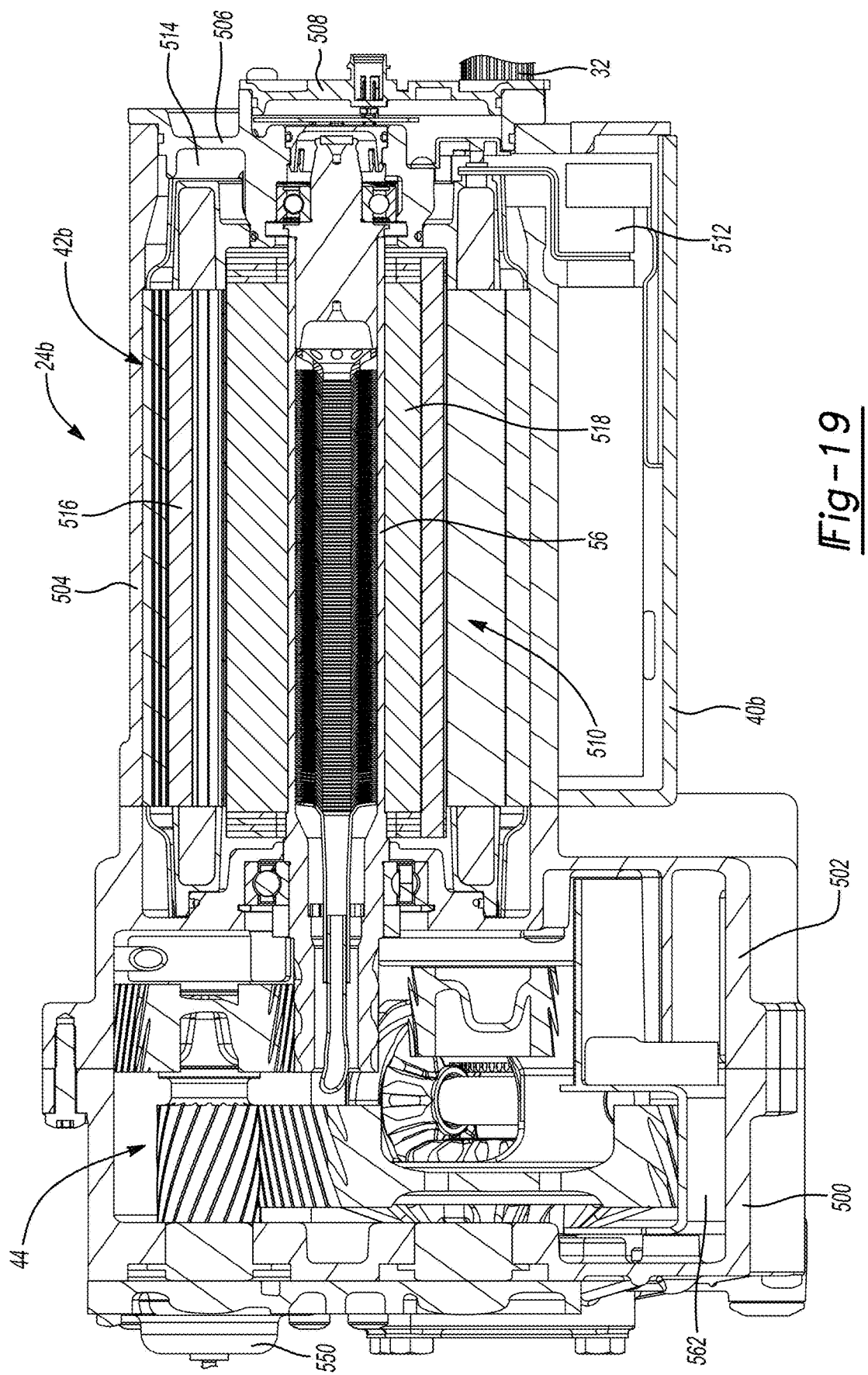
FIG. 19 is a section view of the electric drive module of FIG. 18

In FIGS. 18 and 19, a third exemplary electric drive module constructed in accordance with the teachings of the present disclosure is generally indicated by reference numeral 24b. Components, aspects, features and functions of the electric drive module 24b that are not expressly described herein or shown (partly or fully) in the accompanying drawings, could be configured or function in a manner that is similar to the components, aspects, features and/or functions of electric drive units that are described in co-pending U.S. patent application Ser. No. 16/751,596 filed Jan. 24, 2020, U.S. patent application Ser. No. 16/865,912 filed May 4, 2020, U.S. patent application Ser. No. 17/128,288 filed Dec. 21, 2020, International Patent Application No. PCT/US2020/029925 filed Apr. 24, 2020, International Patent Application No. PCT/US2020/062541 filed Nov. 30, 2020, and/or U.S. Provisional Patent Application No. 63/159,511 filed Mar. 11, 2021, the disclosures of which are incorporated by reference as if fully set forth in detail herein. In brief, the electric drive module 24b includes a housing 40b, a motor assembly 42b, a transmission 44, a differential assembly 46, and a pair of output shafts 32.

The housing 40b can define one or more cavities (not specifically shown) in which the motor assembly 42b, the transmission 44, the differential assembly 46, and the output shafts 32 can be at least partly housed. In the example shown, the housing 40b includes a gearbox cover 500, a gearbox 502, a motor housing 504, a motor housing cover 506 and an end cover 508. The gearbox cover 500 and the gearbox 502 abut one another and form a cavity into which the transmission 44 and the differential assembly 46 are received, while the gearbox 502, the motor housing 504 and the motor housing cover 506 abut one another to form a cavity into which the motor assembly 42b is received.

With specific reference to FIG. 19, the motor assembly 42b comprises an electric motor 510, and a motor control unit 512 that includes an inverter 514. The electric motor 510 includes a stator 516 and a rotor 518 that is rotatable about a first rotational axis 58. The rotor 518 includes a motor output shaft 56.

Figure 20:
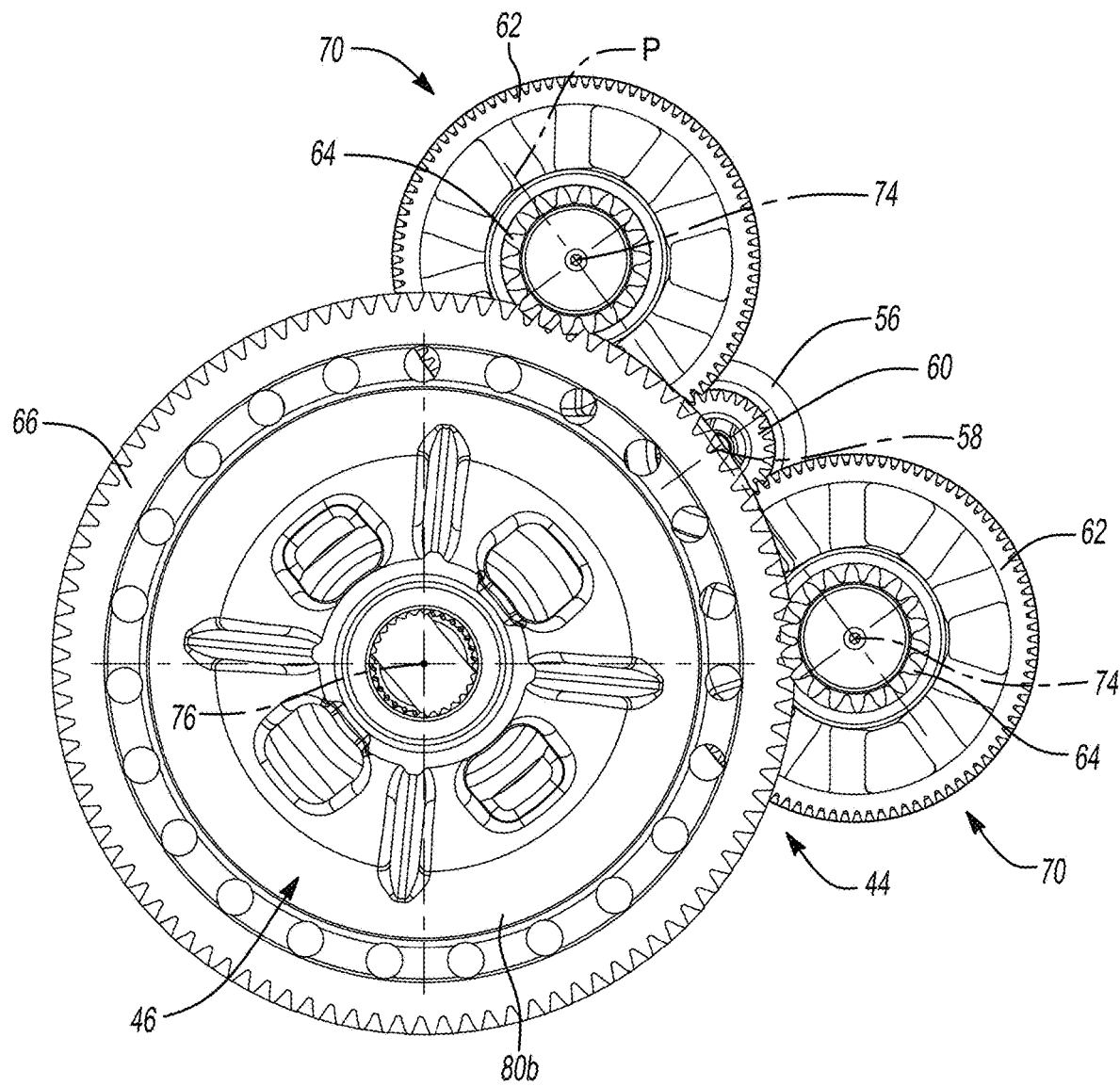
FIG. 20 is an elevation view of a portion of the electric drive module of FIG. 18 that illustrates a portion of a drive unit in more detail.

With reference to FIGS. 19 and 20, the transmission 44 can be configured in any desired manner to transmit rotary power between the motor output shaft 56 and a differential input member 80b of the differential assembly 46. The transmission 44 could comprise one or more fixed reductions of any desired type, or could be configured as a multi-speed transmission having two or more alternately engagable reductions (and optionally one or more fixed reductions). The fixed or multi-speed reductions could be configured in any desired manner to permit the rotational axis of the motor output shaft 56 to be oriented relative to the output axis 76 in a desired manner (e.g., parallel and offset, coincident, transverse, perpendicular, skewed).

Figure 21:
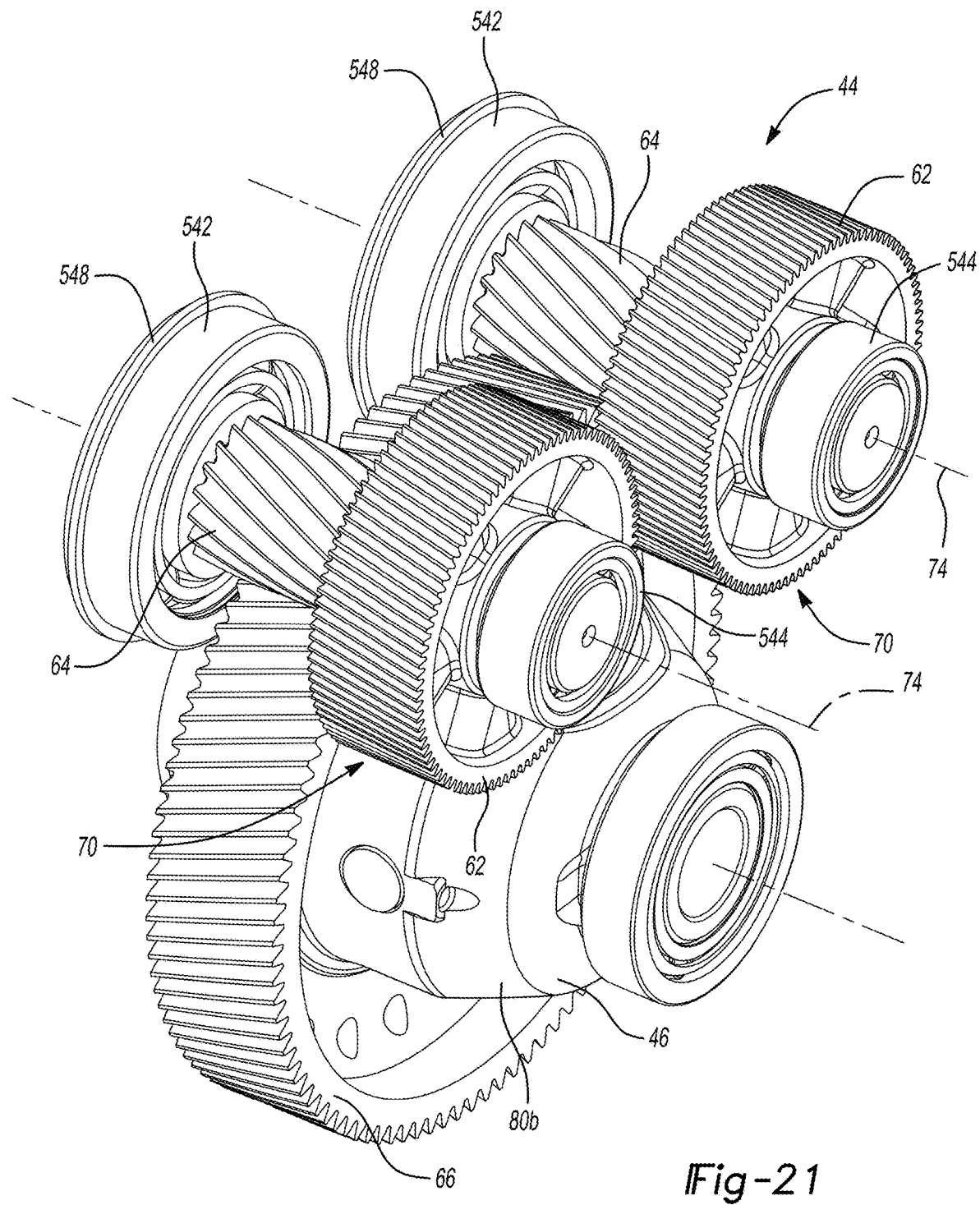
FIG. 21 is a perspective view of a portion of the electric drive module of FIG. 18 that illustrates a portion of the drive unit in more detail.

In the example illustrated in FIGS. 20 and 21, the transmission 44 is a single-speed, multi-stage transmission employing a plurality of helical gears. The transmission 44 comprises a transmission input gear 60, which is coupled for rotation with the motor output shaft 56, a pair of compound gears 70 and a transmission output gear 66. Each of the compound gears 70 is rotatable about a second rotational axis 74 that is parallel to and offset from the first rotational axis 58 and can include a first reduction gear 62, which can be meshingly engaged to the transmission input gear 60, and a second reduction gear 64 that is coupled to the first reduction gear 62 for rotation therewith and meshingly engaged to the transmission output gear 66.

Figure 22:
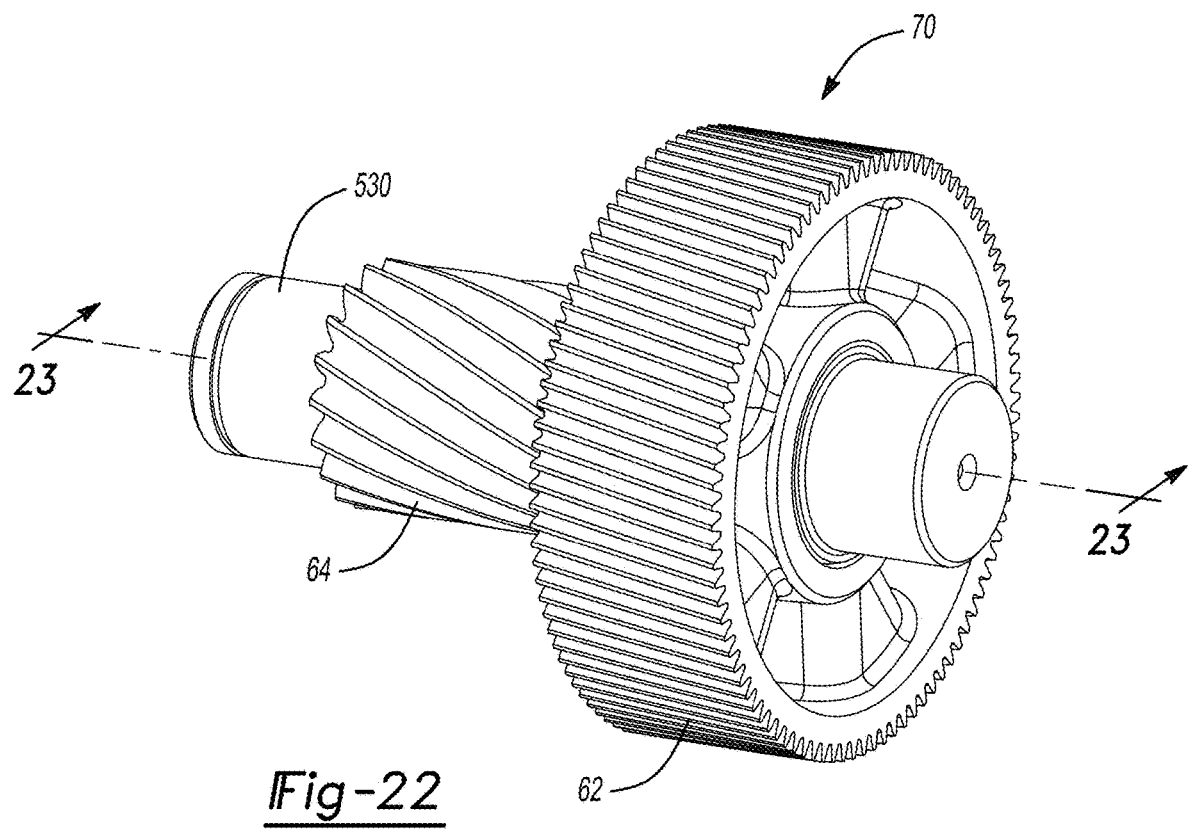
FIG. 22 is a perspective view of a portion of the drive unit shown in FIG. 21 that illustrates a shaft member and a first reduction gear of a transmission in more detail.
Figure 23:
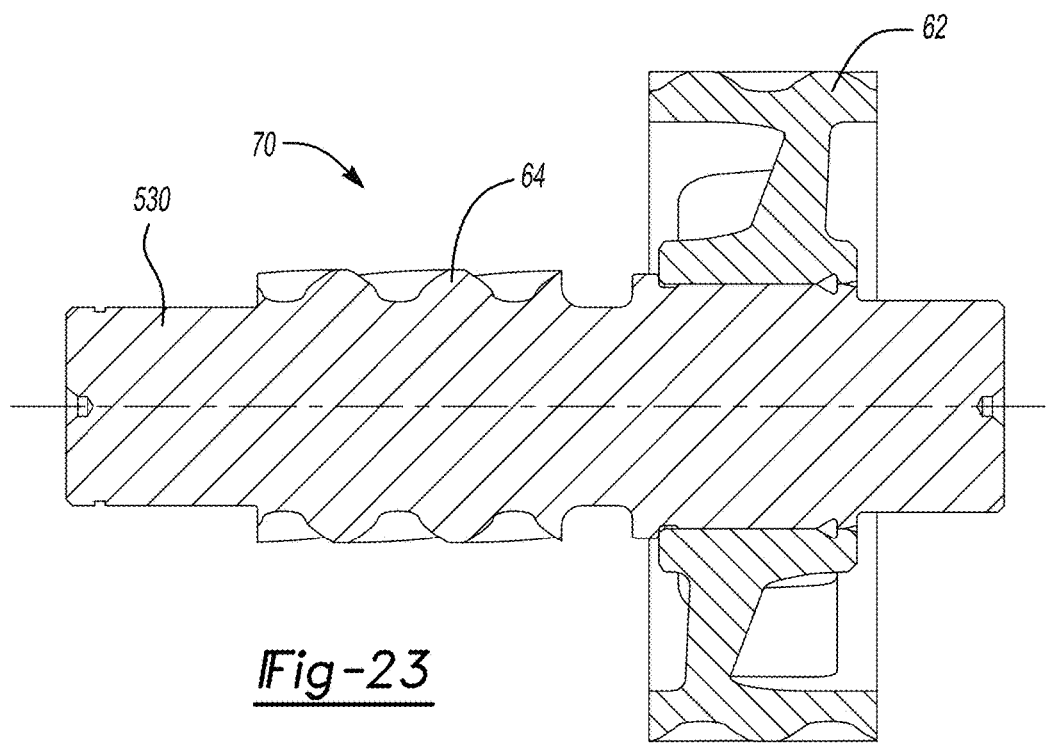
FIG. 23 is a perspective section view of the shaft member and the first reduction gear.

With reference to FIGS. 22 and 23, each of the compound gears 70 can be configured such that the second reduction gear 64 is integrally and unitarily formed with a shaft member 530 and the first reduction gear 62 is rotationally coupled to the shaft member 530 in a desired manner, such as by laser welding. It will be appreciated, however, that the shaft member 530 could be integrally and unitarily formed with the first reduction gear 62 instead of the second reduction gear 64, or that the shaft member 530 could be a discrete component to which both the first and second reduction gears 62 and 64 are rotationally coupled, or that the first and second reduction gears 62 and 64 could be unitarily and integrally formed with the shaft member 530. The shaft member 530 can extend axially outwardly from each of the first and second reduction gears 62 and 64. In the particular example provided, the shaft member 530 and the second reduction gear 64 are identical components in each of the compound gears 70. It will be appreciated, however, that the shaft member 530 and the second reduction gear 64 could be unique for each of the compound gears 70, or that the compound gears 70 (i.e., the first and second reduction gears 62 and 64 and the shaft member 530 in the example provided) could be identical. In some situations, it may be necessary and/or desirable to time the compound gears 70 such that a specific tooth on each of the first reduction gears 62 meshingly engages a specific valley on the transmission input gear 60 (or vice versa), and/or so that a specific tooth on each of the second reduction gears 64 meshingly engages a specific valley on the transmission output gear 66 (or vice versa). In other situations, it may be desirable to configure the transmission such that the compound gears 70 need not be timed to either of the transmission input gear 60 and the transmission output gear 66.

Returning to FIGS. 20 and 21, the first reduction gears 62 can be disposed in counterphase with respect to one another. In this regard, one of the first reduction gears 62 can be positioned such that one of its teeth is received between and centered between two adjacent teeth on the transmission input gear 60, and one of the teeth of the transmission input gear 60 is disposed between two adjacent teeth on the other one of the first reduction gears 62. It will be appreciated, however, that the other phasing could be employed, and that the teeth of both of the first reduction gears 62 could be in-phase with one another. The second reduction gears 64 can be disposed in-phase with one another. In this regard, one of the teeth on a first one of the second reduction gears 64 is received and centered between a first pair of adjacent teeth on the transmission output gear 66, while at the same time one of teeth on the second one of the second reduction gears 64 is received and centered between a second pair of adjacent teeth on the transmission output gear 66. It will be appreciated, however, that other phasing could be employed, that the teeth of the second reduction gears 64 could be in a counter-phase orientation with one another, and that the phasing of the second reduction gears 64 can be the same or different from the phasing of the first reduction gears 62.

Figure 24:
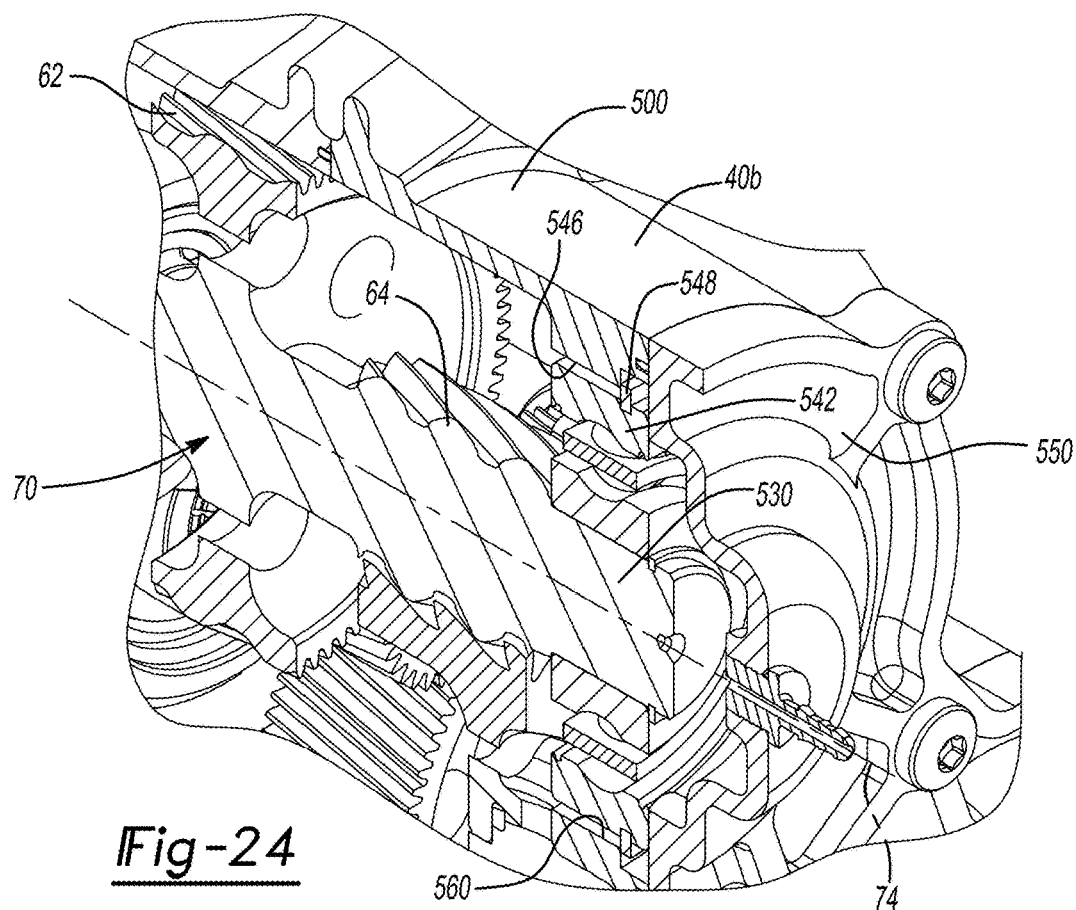
FIG. 24 is a perspective section view illustrating a portion of the drive unit that includes the shaft member, the first reduction gear, and a housing.
Figure 25:
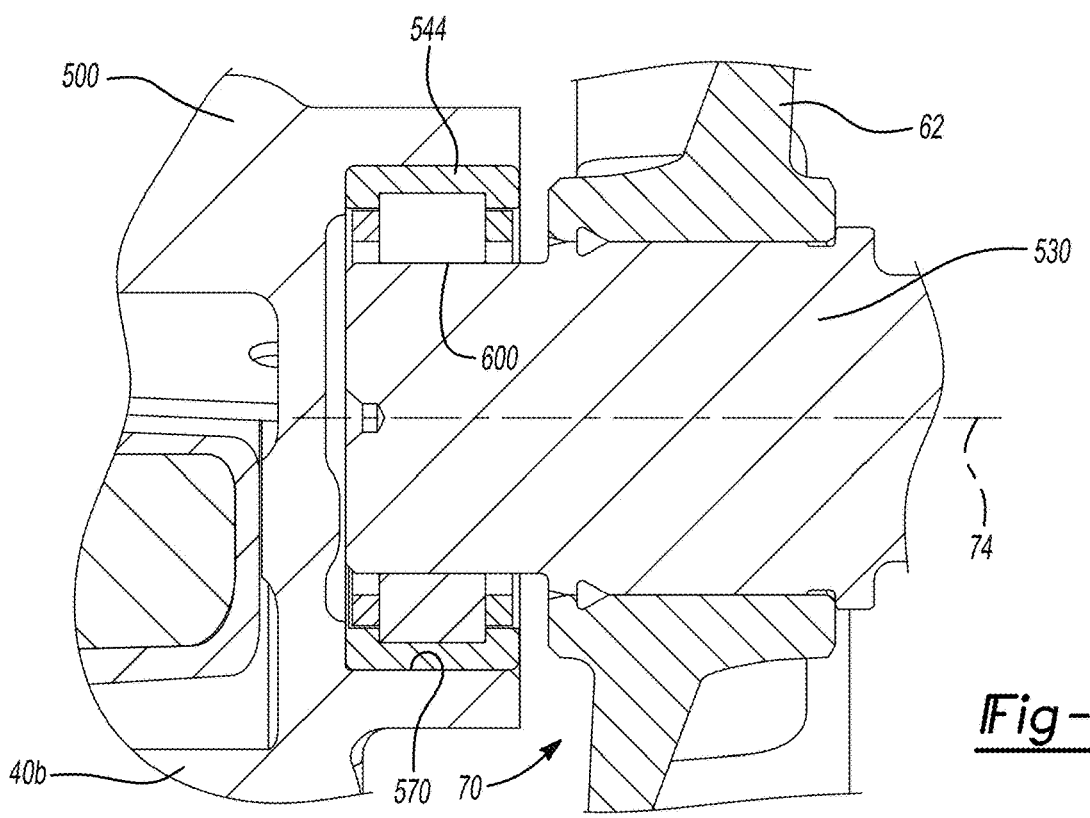
FIG. 25 is a perspective section view illustrating a portion of the drive unit that includes the shaft member, a second reduction gear, and the housing.
Figure 26:
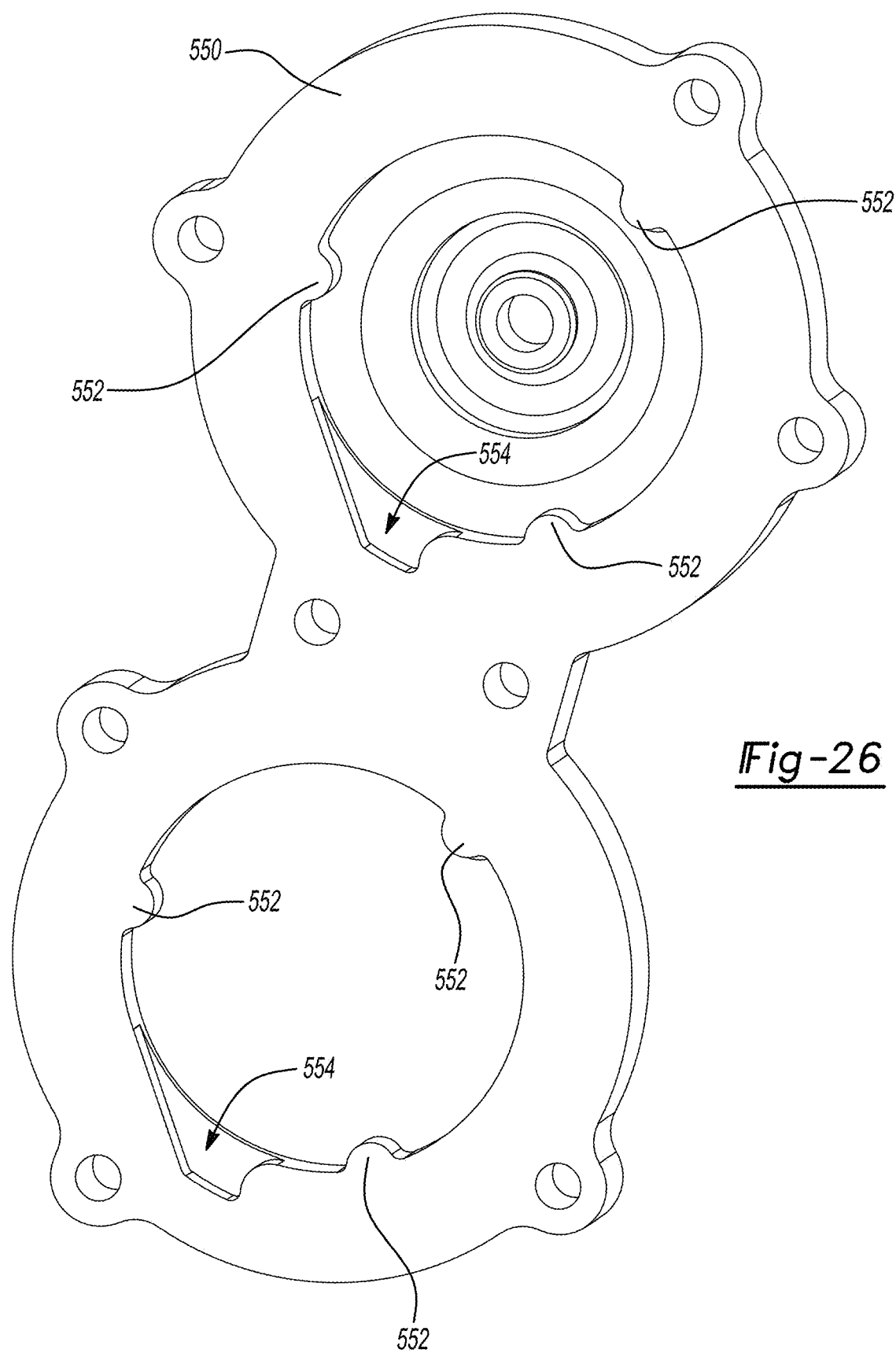
FIG. 26 is an elevation view of a portion of the housing of electric drive module of FIG. 18.

With reference to FIGS. 21, 24 and 25, each compound gear 70 can be supported for rotation relative to the housing 40*b* by a first bearing 542 and a second bearing 544. In addition to the capability of handling and transmitting radially-directed forces between the compound gear 70 and the housing 40*b*, the first bearing 542 can be a type of ball bearing that is configured to handle and transmit forces that are directed axially along the second rotational axis 74 of the compound gear 70 when rotary power is transmitted through the transmission 44. For example, the first bearing 542 could be a type of angular contact bearing or a deep groove ball bearing. The first bearing 542 can be received in a bore 546 formed in the gearbox cover 500 and a snap ring 548 or other type of engagement could be secured to the outer bearing race of the first bearing 542 and to a shoulder formed in or coupled to an axial end of the gearbox cover 500 to inhibit axial movement of the first bearing 542 in a first axial direction along the second rotational axis 74 (i.e., the rotational axis of the compound gear 70). The housing 40*b* can further comprise a bearing cover 550 that can be mounted to the gearbox cover 500 to close the bores 546 in the gearbox cover 500 and shroud the first bearings 542. If desired, pads or bosses 552 (FIG. 26) can be formed onto the bearing cover 550 to radially overlap and axially abut the outer bearing races of the first bearings 542 to further support and stabilize the first bearings 542. Additionally, or alternatively, passages 554 (FIG. 26) can be provided in the bearing cover 550 to permit lubrication passing through the first bearings 542 to drain to an oil drain channel 560 in the gearbox cover 500 that permits the lubrication to drain to a desired area, such as a sump 562 (FIG. 19).

With reference to FIGS. 21 and 25, the second bearing 544 can be a type of bearing that is configured to at least substantially or exclusively handle and transmit radially-directed forces between the compound gear 70 and the housing 40*b*. In the example shown, the second bearing 544 is a roller bearing that employs cylindrically-shaped rollers between an inner bearing race and an outer bearing race. The second bearing 544 can be received into a bore 570 formed into the gearcase 500. If desired, the inner bearing race 600 could be formed onto the shaft member 530 to which the first and second reduction gears 62 and 64 are rotationally coupled.

With renewed reference to FIGS. 20 and 21, the second rotational axes 74 (i.e., the rotational axes of the compound gears 70) can be disposed relative to the first rotational axis 58 in any desired manner to satisfy or accommodate criteria such as the overall speed or gear reduction of the transmission 44, the size of the envelope into which the electric drive module 24*b* (FIG. 18) can be packaged and/or the extent to which the loading of the teeth of the first reduction gears 62 is equalized. In the example shown, the second rotational axes 74 and the first rotational axis 58 are disposed in a plane P and an even number of teeth are formed on the transmission input gear 60. Configuration in this manner can help to balance the loads that are transmitted between each of the first reduction gears 62 and the transmission input gear 60.

Figure 27:
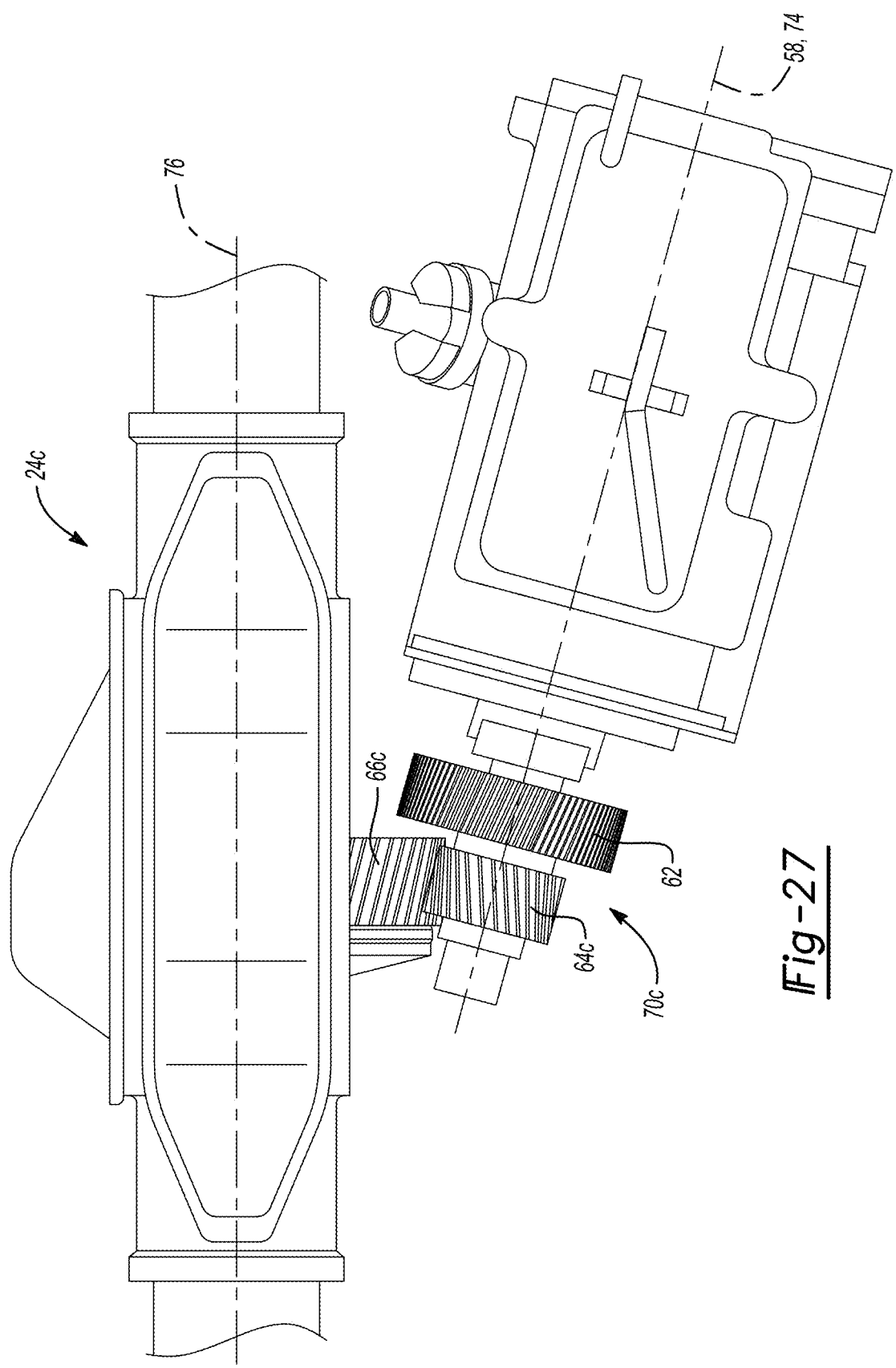
FIG. 27 is top plan view of another electric drive module constructed in accordance with the teachings of the present disclosure.
Figure 28:
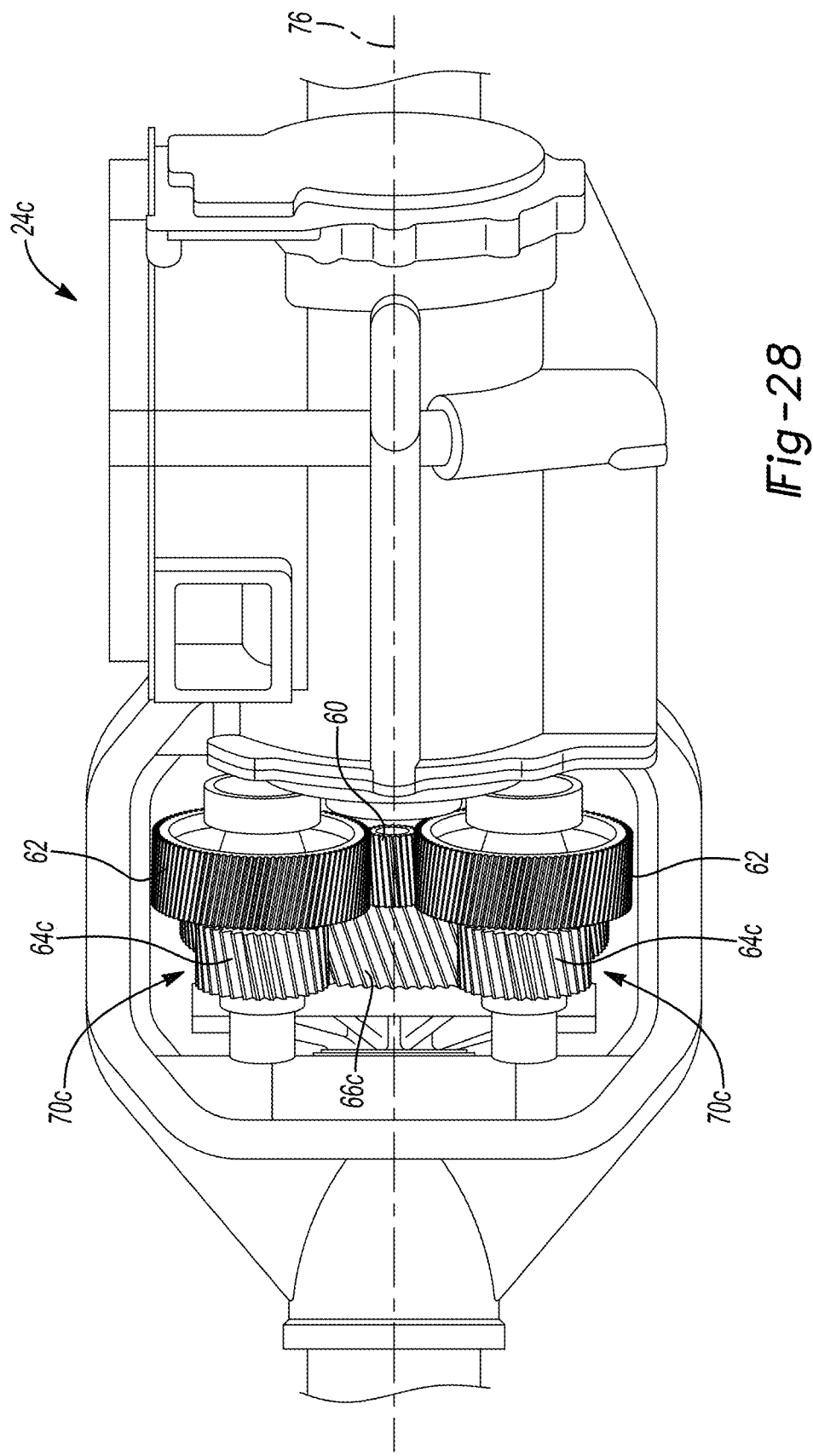
FIG. 28 is an elevation view of the portion of the electric drive module of FIG. 27.
Figure 29:
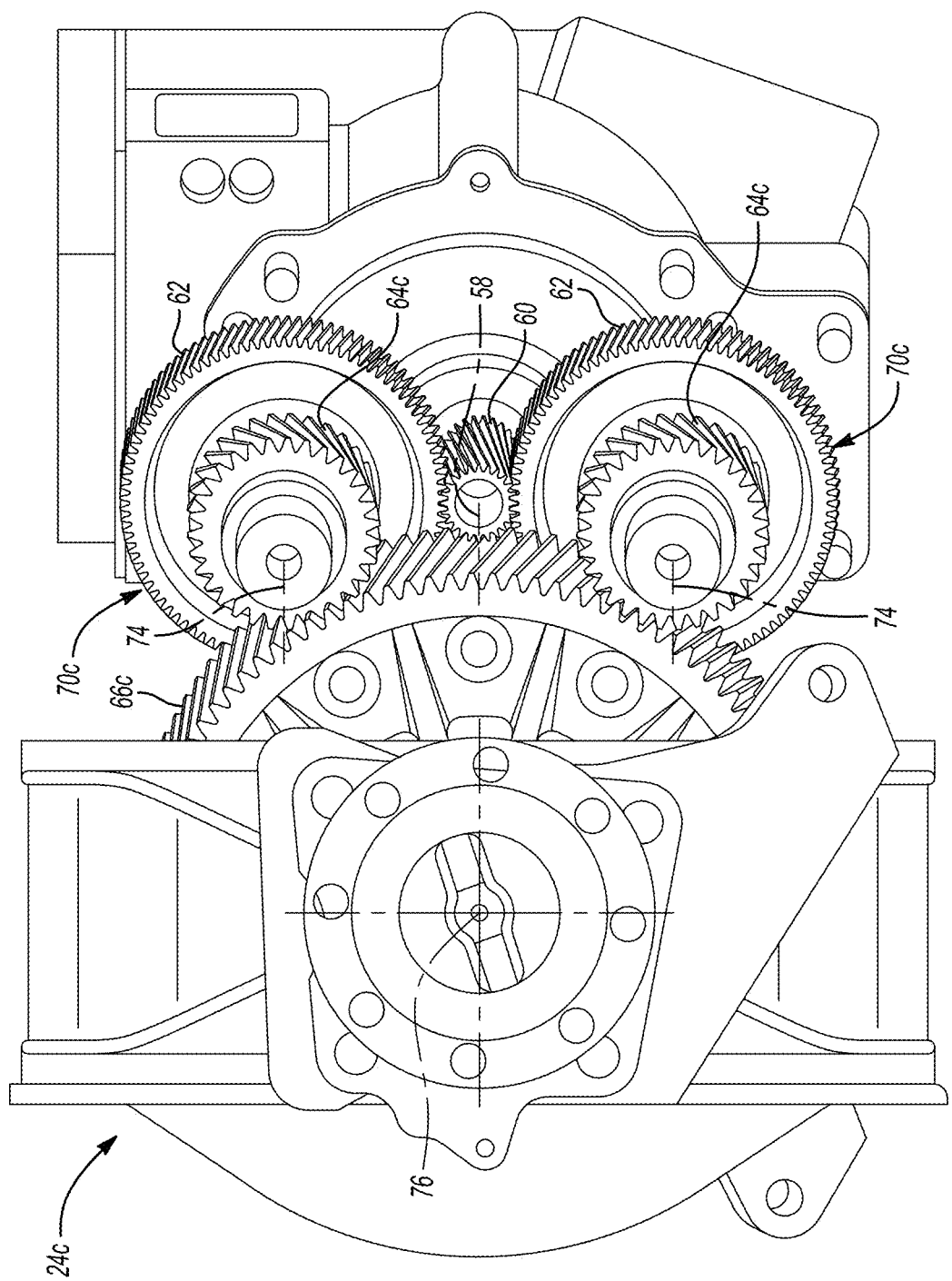
FIG. 29 is a side view of the portion of the electric drive module of FIG. 27.

In FIGS. 27 through 29, a portion of a fourth exemplary electric drive module constructed in accordance with the teachings of the present disclosure is generally indicated by reference numeral 24*c*. Components, aspects, features and functions of the electric drive module 24*c* that are not expressly described herein or shown (partly or fully) in the accompanying drawings, could be configured or function in a manner that is similar to the components, aspects, features and/or functions of electric drive units that are described in any of the embodiments that are described above. In this example, the first and second rotational axes 58 and 74 are parallel to one another, but are not parallel to the output axis 76. Rather, the second rotational axes 74 are skewed to the output axis 76 by a skew angle that is greater than zero (0) degrees, such as 15 degrees, for example. Consequently, the second reduction gears 64*c* of the compound reduction gears 70*c* and the drive gear 66*c* can be formed as non-cylindrical gears (e.g., beveloid, hypoloid or other non-orthogonal gears). Construction in this manner permits the motor assembly to extend away from the housing with increasing distance from the input pinion 60 along the first rotational axis 58. In the example provided, the non-orthogonal configuration of the second reduction gears 64*c* and the drive gear 66*c* provides additional clearance between one of the tubes of the housing and the end of the motor assembly that is opposite the input pinion 60. As shown, the housing includes a pair of tubes that are press-fit into tubular projections formed onto a central housing member. Weld slugs are received through apertures in the tubular projections and are welded to an associated one of the tubes to inhibit axial and rotational movement of the tubes relative to the central housing member.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. An electric drive module having:
   a housing assembly that includes a motor housing, a gearbox and a gearbox cover, the motor housing defines a motor cavity, and the gearbox and the gearbox cover cooperate to define a transmission cavity;

a motor assembly housed in the motor housing and having an electric motor and an inverter, the electric motor having a stator and a rotor, the rotor having a motor output shaft;

a first output shaft that is rotatable about an output axis; and a transmission transmitting rotary power between the electric motor and the output shaft, the transmission including a drive gear, a pair of first reduction gears, a pair of second reduction gears and a driven gear, the drive gear being coupled to the motor output shaft for rotation therewith about a first axis, each of the first reduction gears being meshingly engaged to the drive gear and being rotatable about a respective second axis, wherein the second axes are spaced apart from one another and are parallel to the first axis, each of the second reduction gears being meshingly engaged to the driven gear and is coupled to an associated one of the first reduction gears for rotation therewith, wherein the driven gear is rotatable about a third axis that is parallel to and offset from the first and second axes and does not pass through the electric motor;

a second output shaft;

a differential assembly having a differential input member, which is coupled for rotation with the driven gear, and first and second differential output members, wherein the first and second output shafts are coupled for rotation with the first and second differential output members, respectively;

a park lock mechanism having a first rotatable park lock gear and a first pawl, the first rotatable park lock gear having a plurality of first park lock teeth, the first pawl being pivotably coupled to the housing assembly and pivotable between a first position, which clears the first park lock teeth of the first rotatable park lock gear, and a second position where the first pawl is disposed between the first park lock teeth of the first rotatable park lock gear to thereby inhibit rotation of the first rotatable park lock gear relative to the housing assembly; and a second rotatable park lock gear and a second pawl, the second rotatable park lock gear having a plurality of second park lock teeth, each of the first and second rotatable park lock gears being coupled to an associated one of the second reduction gears for rotation therewith, the second pawl being fixedly coupled to the first pawl, wherein placement of the first pawl in the first position correspondingly positions the second pawl in a position that clears the second park lock teeth of the second rotatable park lock gear, and wherein placement of the first pawl in the second position correspondingly positions the second pawl between the second park lock teeth of the second rotatable park lock gear to thereby inhibit rotation of the second rotatable park lock gear relative to the housing assembly.

2. The electric drive module of claim 1, wherein the differential assembly includes a differential gearset.

3. The electric drive module of claim 2, wherein the differential gearset comprises a plurality of differential pinions that are in meshing engagement with the differential output members.

4. The electric drive module of claim 3, wherein a pair of the differential pinions are mounted on a cross-pin that is mounted to the differential input member.

5. The electric drive module of claim 1, wherein when the first pawl is disposed in the second position, a first load transmitted between the first pawl and the first rotatable park lock gear is equal to a second load transmitted between the second pawl and the second rotatable park lock gear.

6. The electric drive module of claim 5, wherein the first pawl is pivotably disposed on a pivot axle, and wherein a fit between the first pawl and the pivot axle permits non-rotational movement of the first pawl relative to the pivot axle to permit load transmitted between the first and second pawls and the first and second rotatable park lock gears to equalize.

7. An electric drive module comprising:

a housing;

an electric motor coupled to the housing, the motor having a motor output shaft that is rotatable about a motor axis;

a first output shaft that is rotatable about an output axis that is parallel to the motor axis; and a transmission received in the housing and transmitting rotary power between the electric motor and the first output shaft, the transmission having an input pinion, a pair of first compound gears and a driven gear, the input pinion being coupled to the motor output shaft for rotation therewith, each of the first compound gears being rotatable about a first intermediate axis that is parallel to the motor axis, each of the first compound gears having a first reduction gear, which is meshingly engaged with the input pinion, and a second reduction gear that is coupled to the first reduction gear for rotation therewith, the driven gear being received in the housing and being meshingly engaged by the second gears;

wherein loading on the driven gear is shared evenly across the second reduction gears, wherein the output axis is offset from the motor axis and the intermediate axes, and wherein the output axis does not pass through the electric motor;

wherein the electric drive module is operable to rotate the first output shaft at a predetermined rotational output speed, wherein the motor output shaft rotates at a rotational speed that is equal to or greater than 19,000 rotations per minute and wherein a pitch line velocity of each of the first and second reduction gears is less than or equal to 37 meters/second when the first output shaft is driven at the predetermined rotational output speed.

8. The electric drive module of claim 7, further comprising a differential assembly and a second output shaft, the differential assembly being disposed in the housing and having a differential input member and a pair of differential output members, the differential input member being driven by the transmission, each of the differential output members being rotatable relative to the differential input member about the output axis, wherein each of the first and second output shafts is coupled for rotation with an associated one of the differential output members.

9. The electric drive module of claim 8, wherein the differential input member is coupled for rotation with the driven gear.

10. The electric drive module of claim 7, wherein the rotational speed at which the motor output shaft rotates when the first output shaft is driven at the predetermined rotational output speed is equal to or greater than 20,000 rotations per minute.

11. The electric drive module of claim 10, wherein the rotational speed at which the motor output shaft rotates when the first output shaft is driven at the predetermined rotational output speed is equal to or greater than 22,000 rotations per minute.

12. The electric drive module of claim 11, wherein the rotational speed at which the motor output shaft rotates when the first output shaft is driven at the predetermined rotational output speed is equal to or greater than 24,000 rotations per minute.

13. The electric drive module of claim 7, wherein the pitch line velocity of each of the first and second reduction gears is less than or equal to 35 meters/second.

14. An electric drive module comprising:
a housing;
an electric motor coupled to the housing, the motor having a motor output shaft that is rotatable about a motor axis;
a first output shaft that is rotatable about an output axis that is parallel to the motor axis; and
a transmission received in the housing and transmitting rotary power between the electric motor and the first output shaft, the transmission having an input pinion, a pair of first compound gears and a driven gear, the input pinion being coupled to the motor output shaft for rotation therewith, each of the first compound gears being rotatable about a first intermediate axis that is parallel to the motor axis, each of the first compound gears having a first reduction gear, which is meshingly engaged with the input pinion, and a second reduction gear that is coupled to the first reduction gear for rotation therewith, the driven gear being received in the housing and being meshingly engaged by the second gears;
wherein loading on the driven gear is shared evenly across the second reduction gears, wherein the output axis is offset from the motor axis and the intermediate axes, and wherein the output axis does not pass through the electric motor;
wherein the motor axis and the first intermediate axes are disposed in a common plane.

15. The electric drive module of claim 14, further comprising a differential assembly and a second output shaft, the differential assembly being disposed in the housing and having a differential input member and a pair of differential output members, the differential input member being driven by the transmission, each of the differential output members being rotatable relative to the differential input member about the output axis, wherein each of the first and second output shafts is coupled for rotation with an associated one of the differential output members.

16. The electric drive module of claim 15, wherein the differential input member is coupled for rotation with the driven gear.

17. An electric drive module comprising:
a housing;
an electric motor coupled to the housing, the motor having a motor output shaft that is rotatable about a motor axis;
a first output shaft that is rotatable about an output axis; and
a transmission received in the housing and transmitting rotary power between the electric motor and the first output shaft, the transmission having an input pinion, a pair of first compound gears and a driven gear, the input pinion being coupled to the motor output shaft for rotation therewith, each of the first compound gears being rotatable about a first intermediate axis, each of the first compound gears having a first reduction gear, which is meshingly engaged with the input pinion, and a second reduction gear that is coupled to the first reduction gear for rotation therewith, the driven gear being received in the housing and being meshingly engaged by the second gears;
wherein loading on the driven gear is shared evenly across the second reduction gears, wherein the output axis is offset from the motor axis and the intermediate axes, wherein the output axis does not pass through the electric motor, and wherein the driven gear and the second reduction gears are selected from a group of gears consisting of beveloid gears, hypoloid gears and non-orthogonal gears.

18. The electric drive module of claim 17, further comprising a differential assembly and a second output shaft, the differential assembly being disposed in the housing and having a differential input member and a pair of differential output members, the differential input member being driven by the transmission, each of the differential output members being rotatable relative to the differential input member about the output axis, wherein each of the first and second output shafts is coupled for rotation with an associated one of the differential output members.

19. The electric drive module of claim 18, wherein the differential input member is coupled for rotation with the driven gear.

* * * * *